United States Patent
Serjeantson et al.

(10) Patent No.: US 8,918,205 B2
(45) Date of Patent: Dec. 23, 2014

(54) ADJUSTABLE SPEED CONTROL SYSTEM, METHOD AND COMPUTER READABLE MEDIUM FOR USE WITH A CONVEYOR AND A READER

(75) Inventors: Kirk Edward Serjeantson, Markham (CA); Andrew Silerio Vicencio, Barrie (CA); Cameron James Laird, Milton (CA); Adam Stevenson, Hamilton (CA)

(73) Assignee: Purolator Inc., Mississauga, Ontario (CA)

( * ) Notice: Subject to any disclaimer, the term of this patent is extended or adjusted under 35 U.S.C. 154(b) by 0 days.

(21) Appl. No.: 13/309,976

(22) Filed: Dec. 2, 2011

(65) Prior Publication Data

US 2013/0066462 A1  Mar. 14, 2013

(30) Foreign Application Priority Data

Sep. 12, 2011 (CA) .................................. 2752081

(51) Int. Cl.
  *G05B 19/04* (2006.01)
  *B65G 43/00* (2006.01)
(52) U.S. Cl.
  CPC ....................................... *B65G 43/00* (2013.01)
  USPC ........................... 700/230; 700/246; 700/225
(58) Field of Classification Search
  None
  See application file for complete search history.

(56) References Cited

U.S. PATENT DOCUMENTS

| | | | |
|---|---|---|---|
| 4,958,291 A | 9/1990 | Mamone et al. | |
| 5,808,912 A | 9/1998 | Dlugos et al. | |
| 6,779,319 B2 | 8/2004 | Smith et al. | |
| 6,964,367 B2 | 11/2005 | O'Callaghan et al. | |
| 7,097,095 B2 | 8/2006 | Conard et al. | |
| 7,210,894 B2 | 5/2007 | Huang et al. | |
| 7,745,754 B2 | 6/2010 | Conard et al. | |
| 7,816,617 B2 * | 10/2010 | Bennett et al. | 209/584 |
| 8,360,230 B2 * | 1/2013 | Rompe | 198/460.1 |
| 2002/0069186 A1 | 6/2002 | Moore | |
| 2002/0099454 A1 * | 7/2002 | Gerrity | 700/48 |
| 2004/0094885 A1 * | 5/2004 | Flores et al. | 270/58.01 |
| 2004/0165980 A1 | 8/2004 | Huang et al. | |
| 2005/0216118 A1 | 9/2005 | Conard et al. | |
| 2008/0156703 A1 * | 7/2008 | Kenny | 209/3.2 |
| 2011/0166703 A1 * | 7/2011 | Byrne | 700/246 |
| 2011/0240439 A1 * | 10/2011 | Rompe | 198/341.01 |

OTHER PUBLICATIONS

W. T. Lesner, K. G. Hughes, Plant floor information systems via programmable controller/computer networks; Feb. 1983; Automobile Division/Manufacturing Industries Division, Proc Instn Mech Engres; vol. 197B, pp. 27-34.*

* cited by examiner

*Primary Examiner* — Ramya Burgess
*Assistant Examiner* — Lester Rushin
(74) *Attorney, Agent, or Firm* — Fasken Martineau DuMoulin LLP; Kevin E. Holbeche

(57) ABSTRACT

An adjustable speed control system includes a reader, databases, processors and a conveyor controller. The databases store data concerning conveyor stops and failed attempts by the reader to identify conveyed items. Based on the failed attempts and the conveyor stops, the processors calculate an optimal speed of the conveyor. The controller adjusts the conveyor speed towards the optimal speed to increase the conveyed items successfully identified by the reader. Also disclosed are a corresponding method and computer readable medium on which is stored instructions to, upon execution, adjustably control the conveyor speed.

44 Claims, 13 Drawing Sheets

ADJUSTABLE SPEED CONTROL SYSTEM, METHOD AND COMPUTER READABLE MEDIUM FOR USE WITH A CONVEYOR AND A READER

FIELD OF THE INVENTION

The present invention relates generally to a control system, method and computer readable medium for use with a conveyor, and more particularly to an adjustable speed control system, method and computer readable medium for use with a conveyor and a reader.

BACKGROUND OF THE INVENTION

In shipping systems, conveyors and other material handling equipment ("MHE") may be used to carry packages, parcels, pieces and other conveyed items from one location to another within a facility before final shipment to an intended recipient. Among shipping providers, it may also be known to provide readers—e.g., automated reweigh cube ("ARC") system readers—for use in conjunction with such conveyors to ascertain information, and capture revenue which might otherwise be lost, in connection with the conveyed items.

As may be appreciated by persons having ordinary skill in the art, the revenue generating capabilities associated with such prior art conveyor and reader systems may have been limited by the conveyor speed, by any conveyor stoppages, by the conveyor's capacity and the utilization of the conveyed items thereon, and by the ability and efficiency of the reader to timely identify the conveyed items, among other things. More specifically, for example, operating the conveyor at a speed which is less than optimal, or carrying less than an optimal number of items thereon, may have resulted in a lower revenue for a shipping provider than might otherwise have been generated. Similarly, over-loading the conveyor or running it too fast may likewise have resulted in a lower revenue for the shipping provider, at least to the extent that doing so may have made the conveyor prone to stoppages or may have diminished the reader's ability to timely identify the conveyed items.

In fields of art which are perhaps not directly analogous—see, for example, U.S. Pat. No. 6,779,319 which was issued on Aug. 24, 2004 to Smith et al. for "Real-time Intelligent Packet Collation Systems and Methods"—systems may be known which are adapted to read identification information from mail items, to display processing efficiency information, and to provide reports for later diagnosis and/or amelioration of problems experienced by the systems.

In parcel delivery and/or other commercial enterprises which utilize conveyors, it may be desirable to modify a prior art conveyor and reader system to provide flow information to operations and/or management. Preferably, such flow information may find advantageous utility in modifying upstream and downstream loading and unloading processes to increase revenue and facilitate adequate conveyor clear times.

What may be missing from the prior art is a system, adapted for use in conjunction with a conveyor and a reader for identifying the conveyed items, which dynamically uses a count and precise duration of any conveyor stoppages to calculate an optimal speed for the conveyor, and which then automatically controls the actual speed of the conveyor. A contemplated system of this general type may be desirable or may afford advantageous utility for shipping systems and shipping providers, among other possible users. Though not essential to the working of the present invention, thus controlling the actual speed of the conveyor may help to control, manage, improve and/or optimize flow and loading and unloading processes, to facilitate adequate conveyor clear times, and/or to increase revenue.

It may be desirable for such a system to also dynamically use other flow and/or revenue-based information (e.g., a count of the boxes detected by the reader, pieces-per-hour information, dimensions of the pieces which correspond to the pieces-per-hour information) to calculate the optimal speed for the conveyor.

It may be desirable for such a system to directly interface with a conveyor controller or another MHE controller to facilitate automatic control of the conveyor's actual speed towards the optimal speed calculated for the conveyor.

It may also be desirable for such a system to enable communication to and from, and automatic control over, multiple readers, conveyors and/or MHEs.

It may also be desirable to reduce the number or duration of any conveyor stoppages, to otherwise increase the throughput of conveyed items identified by the reader, and/or to alert a user of the system when the system's performance falls outside of acceptable parameters—any or all of which may facilitate the generation of increased revenue.

It may be desirable to physically store, on a computer readable medium, instructions for execution by one or more processors to implement such a modified system.

One of the objectives of the present invention may be to provide a system, method and/or computer readable medium to help move items within a facility.

One of the objectives of an aspect of the present invention may be to provide a system, method and/or computer readable medium to help capture item attributes for additional charges and/or recovery.

One of the objectives of an aspect of the present invention may be to provide a system, method and/or computer readable medium to help merge scan and recovery data for transmission to and/or integration with tracking and billing functions within a larger operation, for example, at the facility or across many facilities.

One of the objectives of an aspect of the present invention may be to provide a system, method and/or computer readable medium adapted for use in parcel delivery or postal applications, in transporting conveyable items to trailers, in transporting of parcels, and/or in improving or facilitating movement of conveyable freight.

One of the objectives of an aspect of the present invention may be to provide a system, method and/or computer readable medium adapted for use in airports or with airlines, and/or to improve or facilitate re-weighing, cubing and/or movement of baggage or air cans.

One of the objectives of an aspect of the present invention may be to provide a system, method and/or computer readable medium for use in supply chain management and/or movement of products.

It is an object of the present invention to obviate or mitigate one or more of the aforementioned mentioned disadvantages and/or shortcomings associated with the prior art, to provide one of the aforementioned needs or advantages, and/or to achieve one or more of the aforementioned objects of the invention.

SUMMARY OF THE INVENTION

According to the invention, there is disclosed an adjustable speed control system for use with at least one conveyor and conveyed items carried thereby. The system includes at least one reader, one or more databases, one or more processors, and a controller operatively connected to the conveyor. The reader is adapted to automatically detect and identify the conveyed items. The databases include, and are regularly updated with, data concerning stops experienced by the conveyor and failed attempts by the reader to identify the conveyed items. The processors are adapted to automatically (i) determine, at regular intervals, a number of the failed attempts, and a duration and a number of the stops experienced by the conveyor. According to the invention, (ii) based at least in part thereon, the processors are also adapted to automatically and dynamically calculate an optimal speed of the conveyor for reducing the number of the failed attempts, the duration and/or the number of the stops. The controller is adapted to automatically and dynamically adjust an actual speed of the conveyor towards the optimal speed. Thus, according to the invention, the system is adapted to operatively facilitate increasing the conveyed items which are successfully identified by the reader.

According to an aspect of one preferred embodiment of the invention, the reader may preferably, but need not necessarily, identify each one of the conveyed items by determining at least one item datum associated with the aforesaid each one. The item datum may preferably, but need not necessarily, be selected from a group which includes of a unique identification tag, an item weight, and/or one or more item dimensions.

According to an aspect of one preferred embodiment of the invention, the reader may preferably, but need not necessarily, include a scanner. The reader may preferably, but need not necessarily, identify the conveyed items by using the scanner to automatically read, preferably from each one of the conveyed items, a unique identification tag associated with the aforesaid each one.

According to another aspect of one preferred embodiment of the invention, the reader may preferably, but need not necessarily, include one or more weight scales associated with the conveyor. The weight scales may preferably, but need not necessarily, be adapted to automatically weigh the conveyed items on the conveyor.

According to yet another aspect of one preferred embodiment of the invention, the reader may preferably, but need not necessarily, include one or more dimensioning sensors associated with the conveyor. The dimensioning sensors may preferably, but need not necessarily, be adapted to automatically detect one or more dimensions associated with each of the conveyed items.

According to an aspect of one preferred embodiment of the invention, one or more of the processors may preferably, but need not necessarily, be further adapted to automatically: (iii) determine, preferably at regular intervals, at least one performance characteristic which may preferably, but need not necessarily, be associated with the conveyor; (iv) compare the performance characteristic against target parameters therefor, with the target parameters preferably being predetermined target parameters; and/or (v) preferably when the performance characteristic is outside of the target parameters, calculate the optimal speed, preferably as further based on the performance characteristic.

According to another aspect of one preferred embodiment of the invention, one or more of the processors may preferably, but need not necessarily, be further adapted to automatically: (iii) determine, preferably at regular intervals, at least one performance characteristic which may preferably, but need not necessarily, be associated with the conveyor; (iv) compare the performance characteristic against target parameters therefor, with the target parameters preferably being predetermined target parameters; and/or (v) preferably when the performance characteristic is outside of the target parameters, generate an alert, preferably for presentation to a user of the system.

According to yet another aspect of one preferred embodiment of the invention, one or more of the processors may preferably, but need not necessarily, be further adapted to automatically: (iii) determine, preferably at regular intervals, at least one performance characteristic which may preferably, but need not necessarily, be associated with the conveyor; and/or (iv) generate a signal, preferably for presentation of the performance characteristic to a user of the system.

According to an aspect of one preferred embodiment of the invention, one or more of the processors may preferably, but need not necessarily, be further adapted to determine the performance characteristic by dynamically determining and/or performing a detected item count of the conveyed items, preferably as detected by the reader over a predetermined time interval.

According to another aspect of one preferred embodiment of the invention, the reader may preferably, but need not necessarily, include one or more dimensioning sensors, preferably adapted to observe the conveyor and/or automatically detect footprint dimensions associated with the conveyed items. One or more of the processors may preferably, but need not necessarily, be further adapted to determine the performance characteristic by: (A) calculating individual footprint areas occupied on the conveyor, preferably by each of the conveyed items for which footprint dimensions are detected by the reader over a predetermined time interval; (B) calculating a total footprint area, preferably by summing together the individual footprint areas; and/or (C) dividing the total footprint area by a corresponding area of the conveyor, preferably observed by the dimensioning sensors over the time interval.

According to yet another aspect of one preferred embodiment of the invention, one or more of the processors may preferably, but need not necessarily, be further adapted to determine the performance characteristic by: (A) calculating a total stop duration, preferably by summing together the duration of each of the stops experienced by the conveyor, whether over a predetermined time interval and/or as a running total; and/or (B) multiplying the total stop duration by an average cost, preferably a predetermined average cost, and preferably associated with the time interval and/or with the stops.

According to still another aspect of one preferred embodiment of the invention, one or more of the processors may preferably, but need not necessarily, be further adapted to determine the performance characteristic by: (A) dynamically determining and/or performing a detected item count of the conveyed items, preferably as detected by the reader, whether over a predetermined time interval and/or as a running total; (B) dynamically determining and/or performing an identified item count of the conveyed items, preferably as identified by the reader over the time interval and/or as a running total; and/or (C) dividing the identified item count by the detected item count.

According to a further aspect of one preferred embodiment of the invention, the reader may preferably, but need not necessarily, include one or more dimensioning sensors, preferably adapted to automatically detect one or more dimensions associated with the conveyed items. One or more of the processors may preferably, but need not necessarily, be further adapted to determine the performance characteristic by: (D) automatically determining, preferably based on predetermined rules and/or with reference to the dimensions and/or the failed attempts, if any of the conveyed items is too large for the reader, and/or (E) dynamically determining and/or performing an oversized item count, preferably of the conveyed items which are determined to be too large for the reader, whether over the time interval and/or as a running total. Preferably in determining the performance characteristic, the detected item count may preferably, but need not necessarily, be less the oversized item count.

According to an aspect of one preferred embodiment of the invention, the reader may preferably, but need not necessarily, include one or more dimensioning sensors, preferably adapted to automatically detect one or more dimensions associated with the conveyed items. One or more of the processors may preferably, but need not necessarily, be further adapted to determine the performance characteristic by: (A) automatically determining, preferably based on predetermined rules and/or with reference to the dimensions and/or the failed attempts, if any of the conveyed items is too large for the reader; (B) dynamically determining and/or performing an oversized item count, preferably of the conveyed items which are determined to be too large for the reader, whether over a predetermined time interval and/or as a running total; and/or (C) multiplying the oversized item count by an average revenue, preferably a predetermined average revenue, for each of the conveyed items.

According to an aspect of one preferred embodiment of the invention, one or more of the processors may preferably, but need not necessarily, be further adapted to determine the performance characteristic, whether over a predetermined time interval and/or as a running total, by multiplying the number of the failed attempts by an average item revenue, preferably a predetermined average item revenue, for the conveyed items.

According to the invention, there is also disclosed a method of adjusting an actual speed of a conveyor for use in identifying conveyed items carried thereby. The method includes steps (a), (b), (c) and (d). In step (a), the conveyed items are automatically detected and identified using a reader associated with the conveyor. In step (b), one or more databases are regularly updated with data concerning (i) failed attempts by the reader to identify the conveyed items, and (ii) stops experienced by the conveyor. According to the invention, in step (c), one or more processors are used to automatically: (i) determine, at regular intervals, (A) a number of the failed attempts, and (B) a duration and a number of the stops experienced by the conveyor; and (ii) based at least in part thereon, dynamically calculate an optimal speed of the conveyor for reducing the number of the failed attempts, the duration and/or the number of the stops. In step (d), a controller, operatively connected to the conveyor, is used to automatically and dynamically adjust the actual speed of the conveyor towards the optimal speed. Thus, according to the invention, the method operatively facilitates increasing the conveyed items which are successfully identified by the reader.

According to an aspect of one preferred embodiment of the invention, in step (a), the reader may preferably, but need not necessarily, identify each one of the conveyed items by determining at least one item datum, preferably associated with the aforesaid each one. The item datum may preferably, but need not necessarily, be selected from a group which includes a unique identification tag, an item weight, and/or one or more item dimensions.

According to an aspect of one preferred embodiment of the invention, preferably in step (a), the reader may preferably, but need not necessarily, identify the conveyed items by using a scanner to automatically read, preferably from each one of the conveyed items, a unique identification tag associated with the aforesaid each one.

According to an aspect of one preferred embodiment of the invention, preferably in step (a), the reader may preferably, but need not necessarily, automatically weigh the conveyed items, preferably on the conveyor and/or preferably using one or more weight scales which may preferably be associated with the conveyor.

According to an aspect of one preferred embodiment of the invention, preferably in step (a), the reader may preferably, but need not necessarily, automatically detect one or more dimensions, preferably associated with each of the conveyed items and/or preferably using one or more dimensioning sensors which may preferably be associated with the conveyor.

According to an aspect of one preferred embodiment of the invention, preferably in step (c), one or more of the processors may preferably, but need not necessarily, be further used to automatically: (iii) determine, preferably at regular intervals, at least one performance characteristic which may preferably, but need not necessarily, be associated with the conveyor; and/or (iv) compare the performance characteristic against target parameters therefor, with the target parameters preferably having been predetermined. Preferably when the performance characteristic is outside of the target parameters, the calculation of the optimal speed in substep (c)(ii) may preferably, but need not necessarily, be further based on the performance characteristic.

According to an aspect of one preferred embodiment of the invention, preferably in step (c), one or more of the processors may preferably, but need not necessarily, be further used to automatically: (iii) determine, preferably at regular intervals, at least one performance characteristic which may preferably, but need not necessarily, be associated with the conveyor; (iv) compare the performance characteristic against target parameters therefor, preferably predetermined target parameters therefor; and/or (v) preferably when the performance characteristic is outside of the target parameters, generate an alert, preferably for presentation to a user.

According to an aspect of one preferred embodiment of the invention, in step (c), one or more of the processors may preferably, but need not necessarily, be further used to automatically: (iii) determine, preferably at regular intervals, at least one performance characteristic which may preferably, but need not necessarily, be associated with the conveyor; and/or (iv) generate a signal, preferably for presentation of the performance characteristic and/or preferably to a user.

According to an aspect of one preferred embodiment of the invention, preferably in substep (c)(iii), one or more of the processors may preferably, but need not necessarily, determine the performance characteristic by dynamically determining and/or performing a detected item count of the conveyed items, preferably as detected by the reader, whether over a predetermined time interval and/or as a running total.

According to an aspect of one preferred embodiment of the invention, preferably in step (a), the reader may preferably, but need not necessarily, use one or more dimensioning sensors, preferably to observe the conveyor and/or automatically detect footprint dimensions which may preferably, but need not necessarily, be associated with the conveyed items. Preferably in substep (c)(iii), one or more of the processors may preferably, but need not necessarily, determine the performance characteristic by: (A) calculating individual footprint areas occupied on the conveyor, preferably by each of the conveyed items for which footprint dimensions are detected by the reader, whether over a predetermined time interval and/or as a running total; (B) calculating a total footprint area, preferably by summing together the individual footprint areas; and/or (C) dividing the total footprint area by a corresponding area of the conveyor, preferably as observed by the dimensioning sensors, whether over the time interval and/or as a running total.

According to an aspect of one preferred embodiment of the invention, preferably in substep (c)(iii), one or more of the processors may preferably, but need not necessarily, determine the performance characteristic by: (A) calculate a total stop duration, preferably by summing together the duration of each of the stops experienced by the conveyor, whether over a predetermined time interval and/or as a running total; and/or (B) multiplying the total stop duration by an average cost, preferably a predetermined average cost, preferably associated with the time interval and/or with the stops.

According to an aspect of one preferred embodiment of the invention, preferably in substep (c)(iii), one or more of the processors may preferably, but need not necessarily, determine the performance characteristic by: (A) dynamically determining and/or performing a detected item count of the conveyed items, preferably as detected by the reader, whether over a predetermined time interval and/or as a running total; (B) dynamically determining and/or performing an identified item count of the conveyed items, preferably as identified by the reader, whether over the time interval and/or as a running total; and/or (C) dividing the identified item count by the detected item count.

According to a further aspect of one preferred embodiment of the invention, preferably in step (a), the reader may preferably, but need not necessarily, use one or more dimensioning sensors, preferably to automatically detect one or more dimensions which may preferably, but need not necessarily, be associated with the conveyed items. Preferably in substep (c)(iii), one or more of the processors may preferably, but need not necessarily, further determine the performance characteristic by (D) automatically determining, preferably based on predetermined rules and/or with reference to the dimensions and/or the failed attempts, if any of the conveyed items is too large for the reader, and/or (E) dynamically determining and/or performing an oversized item count of the conveyed items which are determined to be too large for the reader, whether over the time interval and/or as a running total. Preferably in sub step (c)(iii), the detected item count may preferably, but need not necessarily, be less the oversized item count.

According to an aspect of one preferred embodiment of the invention, preferably in step (a), the reader may preferably, but need not necessarily, use one or more dimensioning sensors, preferably to automatically detect one or more dimensions associated with the conveyed items. Preferably in substep (c)(iii), one or more of the processors may preferably, but need not necessarily, determine the performance characteristic by: (A) automatically determining, preferably based on predetermined rules and/or with reference to the dimensions and/or the failed attempts, if any of the conveyed items is too large for the reader; (B) dynamically determining and/or performing an oversized item count of the conveyed items which are determined to be too large for the reader over a predetermined time interval; and/or (C) multiplying the oversized item count by an average revenue, preferably a predetermined average revenue and/or preferably for each of the conveyed items.

According to an aspect of one preferred embodiment of the invention, preferably in substep (c)(iii), one or more of the processors may preferably, but need not necessarily, determine the performance characteristic, whether over a predetermined time interval and/or as a running total, by multiplying the number of the failed attempts by an average item revenue, preferably a predetermined average item revenue and/or preferably for the conveyed items.

According to the invention, there is also disclosed a computer readable medium on which is physically stored executable instructions. The executable instructions are such as to, upon execution, adjustably control an actual speed of a conveyor provided with a controller. The computer readable medium is also for use with (1) conveyed items carried by the conveyor, (2) a reader adapted to automatically detect and identify the conveyed items, and (3) a database which includes data concerning stops experienced by the conveyor and failed attempts by the reader to identify the conveyed items. The executable instructions include processor instructions for one or more processors to automatically and according to the invention: (a) determine, at regular intervals, (i) a number of the failed attempts, and (ii) a duration and a number of the stops experienced by the conveyor; (b) based at least in part thereon, dynamically calculate an optimal speed of the conveyor for reducing the number of the failed attempts, the duration and/or the number of the stops; and (c) generate a signal for transmission to the controller for automatic and dynamic adjustment of the actual speed of the conveyor towards the optimal speed. Thus, according to the invention, the computer readable medium operatively facilitates use of the processors to increase the conveyed items which are successfully identified by the reader.

According to an aspect of one preferred embodiment of the invention, the processor instructions may preferably, but need not necessarily, be additionally for one or more of the processors to automatically: (d) determine, preferably at regular intervals, at least one performance characteristic which may preferably, but need not necessarily, be associated with the conveyor; (e) compare the performance characteristic against target parameters therefor, preferably predetermined target parameters therefor; and/or (f) preferably when the performance characteristic is outside of the target parameters, calculate the optimal speed which may preferably, but need not necessarily, be additionally based on the performance characteristic.

According to an aspect of one preferred embodiment of the invention, the processor instructions may preferably, but need not necessarily, be additionally for one or more of the processors to automatically: (d) determine, preferably at regular intervals, at least one performance characteristic which may preferably, but need not necessarily, be associated with the conveyor; (e) compare the performance characteristic against target parameters therefor, preferably predetermined target parameters therefor; and/or (f) preferably when the performance characteristic is outside of the predetermined target parameters, generate an alert, preferably for presentation to a user.

According to an aspect of one preferred embodiment of the invention, the processor instructions may preferably, but need not necessarily, be additionally for one or more of the processors to automatically: (d) determine, preferably at regular intervals, at least one performance characteristic which may preferably, but need not necessarily, be associated with the conveyor; and/or (e) generate a signal, preferably for presentation of the performance characteristic, and preferably to a user.

According to an aspect of one preferred embodiment of the invention, the processor instructions may preferably, but need not necessarily, be additionally for one or more of the processors to determine the performance characteristic by dynamically determining and/or performing a detected item count of the conveyed items, preferably as detected by the reader, whether over a predetermined time interval and/or as a running total.

According to an aspect of one preferred embodiment of the invention, the processor instructions may preferably, but need not necessarily, be additionally for one or more of the processors to determine the performance characteristic by: (i) calculating individual footprint areas occupied on the conveyor, preferably by each of the conveyed items for which footprint dimensions are detected by the reader, whether over a predetermined time interval and/or as a running total; (ii) calculating a total footprint area, preferably by summing together the individual footprint areas; and/or (iii) dividing the total footprint area by a corresponding area of the conveyor, preferably one which passes the reader over the time interval and/or over the running total time period.

According to an aspect of one preferred embodiment of the invention, the processor instructions may preferably, but need not necessarily, be additionally for one or more of the processors to determine the performance characteristic by: (i) calculating a total stop duration, preferably by summing together the duration of each of the stops experienced by the conveyor, whether over a predetermined time interval and/or as a running total; and/or (ii) multiplying the total stop duration by an average cost, preferably a predetermined average cost and preferably associated with the time interval and/or with the stops.

According to an aspect of one preferred embodiment of the invention, the processor instructions may preferably, but need not necessarily, be additionally for one or more of the processors to determine the performance characteristic by: (i) dynamically determining and/or performing a detected item count of the conveyed items, preferably as detected by the reader, whether over a predetermined time interval and/or as a running total; (ii) dynamically performing an identified item count of the conveyed items, preferably as identified by the reader, whether over the time interval and/or as a running total; and/or (iii) dividing the identified item count by the detected item count.

According to an aspect of one preferred embodiment of the invention, the processor instructions may preferably, but need not necessarily, be additionally for one or more of the processors to further determine the performance characteristic by: (iv) automatically determining, preferably based on predetermined rules and/or with reference to the failed attempts and/or dimensions of the conveyed items, preferably as detected by the reader, if any of the conveyed items is too large for the reader, and/or (v) dynamically determining and/or performing an oversized item count of the conveyed items which are determined to be too large for the reader, whether over the time interval and/or as a running total. The detected item count may preferably, but need not necessarily, be less the oversized item count.

According to an aspect of one preferred embodiment of the invention, the processor instructions may preferably, but need not necessarily, be additionally for one or more of the processors to determine the performance characteristic by: (i) automatically determining, preferably based on predetermined rules and/or with reference to the failed attempts and/or dimensions of the conveyed items, preferably as detected by the reader, if any of the conveyed items is too large for the reader; (ii) dynamically determining and/or performing an oversized item count of the conveyed items which are determined to be too large for the reader, whether over a predetermined time interval and/or as a running total; and/or (iii) multiplying the oversized item count by an average revenue, preferably a predetermined average revenue and/or preferably for each of the conveyed items.

According to an aspect of one preferred embodiment of the invention, the processor instructions are additionally for one or more of the processors to determine the performance characteristic, whether over a predetermined time interval and/or as a running total, by multiplying the number of the failed attempts by an average item revenue, preferably a predetermined average item revenue and/or preferably for the conveyed items.

Other advantages, features and characteristics of the present invention, as well as methods of operation and functions of the related elements of the system, method and computer readable medium, and the combination of steps, parts and economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the system, method and computer readable medium according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PREFERRED EMBODIMENTS

Figure 1:
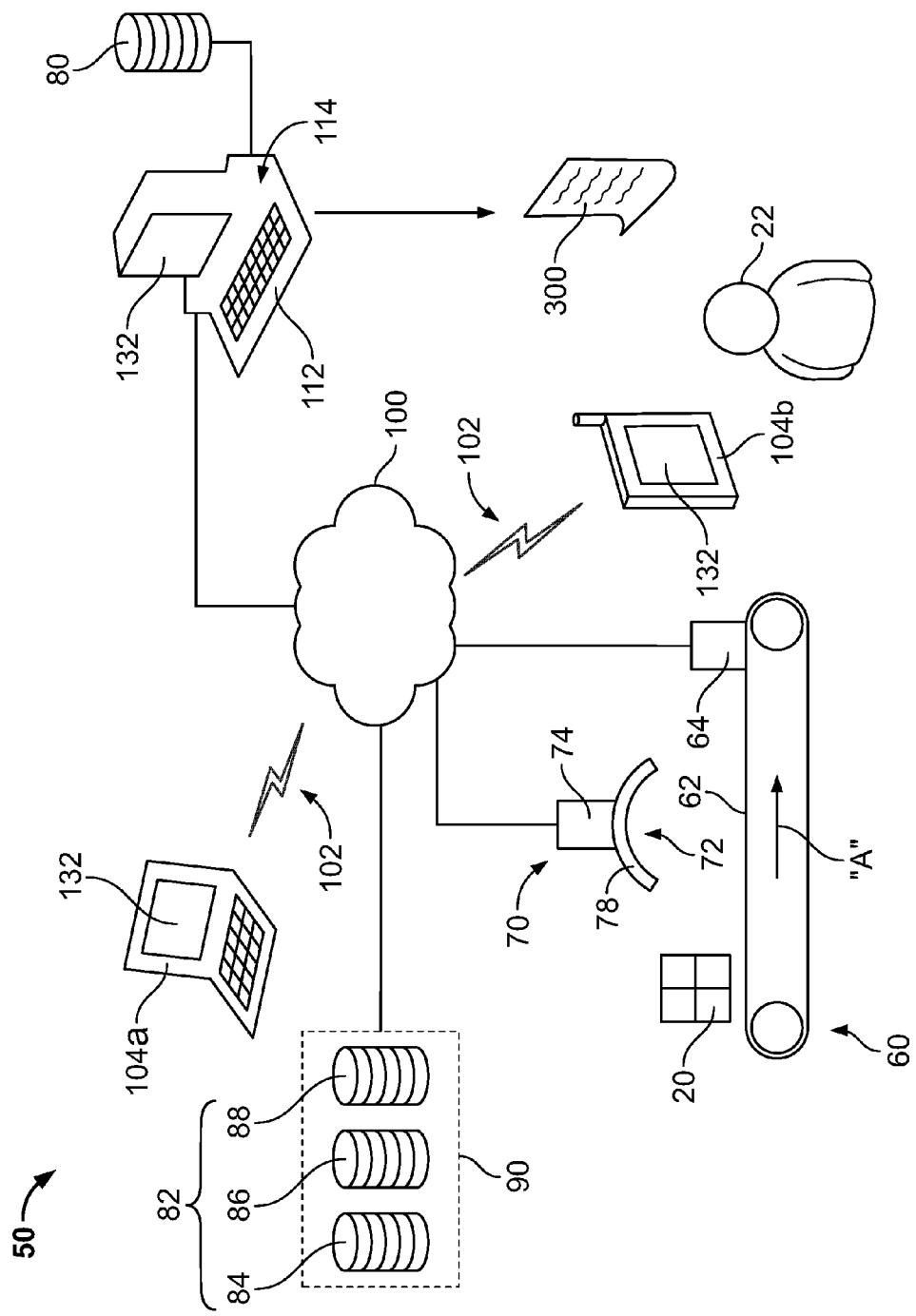
FIG. 1 is a schematic diagram of an adjustable speed control system according to one preferred embodiment of the invention.
Figure 2:
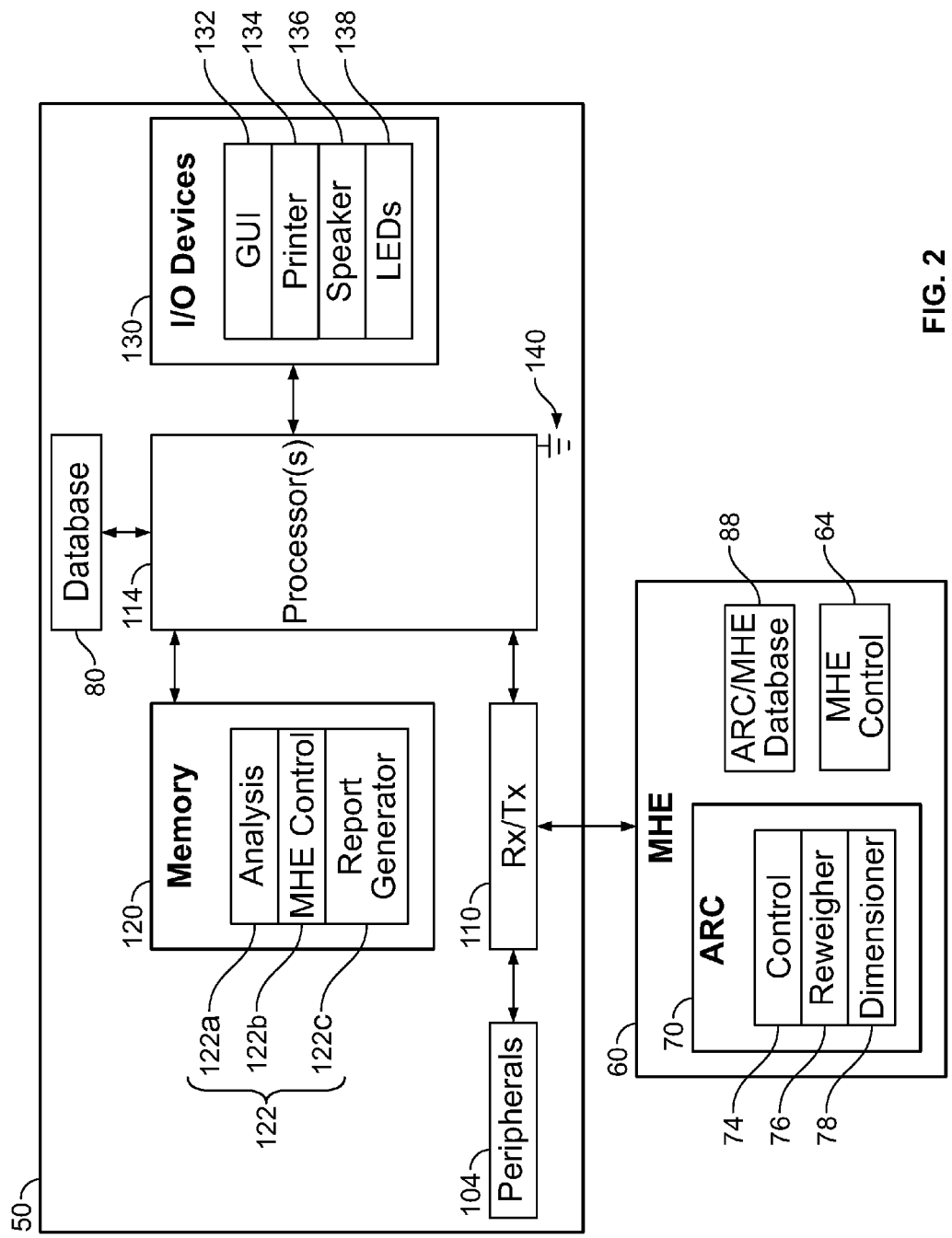
FIG. 2 is a schematic diagram of selected components of the system of FIG. 1, with the material handling equipment shown removed therefrom.

Referring to FIGS. 1 to 11, there is shown an adjustable speed control system 50 for use with at least one conveyor 62 and conveyed items 20 carried thereby, along with steps performed thereby, according to a related method 400, and/or under influence of a related computer readable medium 120. The conveyor 62 may typically convey the items 20 (as indicated generally by arrow "A" in FIG. 1) from one location to another within a facility. It is typically provided along with other material handling equipment ("MHE") 60, as shown in FIGS. 1 and 2.

The system 50 depicted in FIG. 1 may be used within a single facility and/or multiple facilities. For example, some of the components of the system 50 may be provided at a remote location 90. Each of the items (alternately, herein, "packages" or "parcels") 20 may have the unique identification tag, preferably, a barcode affixed thereto. The packages 20 preferably constitute freight or other items moving within a mail system or within a distribution system generally.

Preferably, and as best seen in FIG. 1, the system 50 includes a reader 70, databases 80, 82, processors 114, and a controller 64 operatively connected to the conveyor 62.

In FIGS. 1 and 2, the system 50 is shown in use with one or more communication networks 100, a networked computer 132, and wirelessly networked 102 peripheral devices 104—i.e., a networked laptop 104a and a networked handheld device 104b. The communications networks 80 may include satellite networks (e.g., GPS networks), terrestrial wireless networks, and the Internet. Persons having ordinary skill in the art will appreciate that the system 50 includes hardware and software.

FIG. 2 schematically illustrates, among other things, the processors 114, a wireless transmitter 110, a power source 140, and at least one computer readable medium (e.g., an onboard processor-readable memory) 120. The controller 64 is shown, in FIG. 2, in the form of a MHE controller 64 and in association with the MHE 60. The MHE 60 is shown, in FIG. 2, in association with the reader 70, provided in the form of an automated reweigh cube ("ARC") device 70. The ARC device 70 may be provide with an ARC controller 74. According to the invention, the system 50 may also use the ARC controller 74 to control the reader 70.

Reader

As best seen in FIGS. 1 and 2, the reader 70 is adapted to automatically detect and identify the conveyed items 20. The reader 70 preferably identifies each of the conveyed items 20 by determining the unique identification tag, an item weight, and/or item dimensions associated therewith. More specifically, the reader 70 preferably includes a scanner 72, dimensioning sensors 78 and/or weight scales 76 associated with the conveyor 62.

Preferably, the reader 70 uses the scanner 72 to automatically read the unique identification tags from the conveyed items 20. The scanner 72 is preferably a barcode scanner. The scanner 72 can be an imager, or a laser-based scanner. [The scanner 72 may instead be a radio-frequency identification ("RFID") scanner. When an RFID scanner is provided, one or more of the identification tags on the items 20 are RFID tags.] It may be wired to communicate with, or it may wirelessly communicate—e.g., by the Bluetooth™ proprietary open wireless technology standard which is managed by the Bluetooth Special Interest Group of Kirkland, Wash.—with the databases 80, 82 and/or with the processors 114 (e.g., via the wireless transmitter 152). The scanner 72 is adapted to scan or read information (e.g., a barcode) from each package 60.

The weight scales 76 are shown in FIG. 2. They automatically weigh (i.e., measures a weight of) the conveyed items 20 on the conveyor 62. The weight scales 76 are preferably highly accurate for weighing the packages 60 on the conveyor 62. The scales 76 are preferably accurate to government set precision standards, and may preferably be accurate to about one pound (1 lb.), or perhaps more preferably to about one fifth of a pound (0.2 lbs.). They may be adapted to measure a minimum weight of about two pounds (2 lbs.).

Preferably, the dimensioning sensors 78 automatically detect item dimensions of each of the conveyed items 20.

Databases

The databases 80, 82 include, and are regularly updated with, data concerning stops experienced by the conveyor 62 and failed attempts by the reader 70 to identify the conveyed items 20. The databases 80, 82 may include an automated flow management ("AFM") database 80 and other databases 82, such as, for example, a mail reweigh database 84, a proof of pickup database 86, and/or one or more ARC/MHE databases 88.

As may be best appreciated by a consideration of FIG. 1, one or more of the databases 80, 82 (and the processors 114) preferably may be located remotely from conveyor 62. In FIG. 1, the other databases 82 are shown located a remote location 90.

The databases 80, 82 include information associated with the items 20, and all or part of the databases 80, 82 may be located behind a firewall relative to the communications networks 100. Persons having ordinary skill in the art will appreciate that references herein to the databases 80, 82 comprise references to (i) a single database 80 located at a facility remote from, and/or at the same facility as, the conveyor 62, and/or (ii) one or more congruent and/or distributed databases 80, 82, such as, for example, also including one or more sets of congruently inter-related databases 80, 82—possibly distributed across multiple facilities.

Processors

Preferably, the processors 114 are operatively encoded with one or more algorithms 122 (shown schematically in FIG. 2 as being stored in the memory 120) which provide them with analysis logic 122a, MHE control logic 122b, and/or report generation logic 122c. Preferably, the algorithms 122 enable the processors 114 to assess package and conveyor information received from the databases 80, 82. The data/information collected from the various databases 80, 82 is merged by the processors 114.

The processors 114 automatically determine, at regular intervals, a number 166 of the failed attempts, and a duration and a number 152 of the stops experienced by the conveyor 62. Based at least in part thereon, the processors 114 automatically and dynamically calculate an optimal speed of the conveyor 62 for reducing the number 166 of the failed attempts, the duration and/or the number 152 of the stops.

The system 50 may thus be seen to include a flow calculator to compute and evaluate various actual and preferred flow rates, including an optimal flow rate, based upon the flow information. The flow calculator is also adapted to compute and provide revenue-based information, such as opportunities to increase or maximize revenue, based upon the flow information.

Preferably, the processors 114 automatically determine, at regular intervals, performance characteristics associated with the conveyor 62 (i.e., including those associated with the conveyed items 20 thereon).

The processors 114 may merge the determined performance characteristics with information concerning the conveyor(s) 62 and/or the packages 20 (e.g., package ID numbers, associated services and surcharges, and origin, location and/or destination information), and preferably transmit this data to one or more of the databases 80, 82. In this manner, the merged data may later be retrieved by tracking and billing functions integrated within a larger operation, for example, at the facility or across multiple facilities. These functions may, for example and according to some embodiments of the invention, be "backend" functions in the sense that they may not be performed onsite and/or local to other functions associated with the system 50.

The performance characteristics may be determined in a variety of ways, and a variety of performance characteristics may be determined. In many cases, the performance characteristics may be determined over a particular time interval. The time interval preferably may be a predetermined one. For example, the time interval may be related to the working hours of a particular shift of employees. It may alternately be performed in two (2) hour increments, five (5) minute increments, thirty (30) second increments, or according to some other shorter or longer incremental scale. Further, the time interval may be effectively provided in the form of a running total, for example, if it is predetermined to cover a period from a particular start time to a then present time or to a predetermined end time which has just passed.

Some of the performance characteristics which are discussed herein include a detected item count 158, conveyor utilization, total stop cost, scan quality 164, and potential revenue loss (1 and 2) 156.

Detected Item Count

More specifically, the processors 114 may dynamically determine (e.g., from the ARC/MHE database 88), or may dynamically perform, a detected item count 158 of the conveyed items 20 detected by the reader 70 over the time interval. Alternately, herein the detected item count may be referred to as "pieces per time interval", "packages per time interval" or, simply, "PPTI". Perhaps notably, the count may be initially determined or performed over a shorter period, and the PPTI over the time interval may be determined therefrom. The time interval preferably may be one (1) hour and, in such event, the PPTI may be alternately referred to as "pieces per hour", "packages per hour", or "PPH".

Conveyor Utilization

The processors 114 may determine the performance characteristic by calculating individual footprint areas occupied on the conveyor 62 by each of the conveyed items 20 for which footprint dimensions are detected by the reader 70 over the time interval. The processors then calculate a total footprint area by summing together the individual footprint areas. To determine the conveyor utilization, the total footprint area is then divided by a corresponding area of the conveyor 62 which is observed by the dimensioning sensors 78 over the time interval.

Total Stop Cost

The processors 114 may calculate a total stop duration 154 by summing together the duration of each of the stops experienced by the conveyor 62 over the time interval. To arrive at a total stop cost, the processors may then multiply the total stop duration 154 by an average cost per unit of stopped conveyor time. This average cost preferably may be one which is predetermined.

Scan Quality

The processors 114 may dynamically determine (e.g., from the ARC/MHE database 88), or may dynamically perform, an identified item count of the conveyed items 20 identified by the reader 70 over the time interval. Then, the processors may divide the identified item count by the detected item count 158 (as discussed hereinabove) to calculate the scan quality 164.

Preferably, in calculating the scan quality 164, the processors 114 may automatically determine—whether from the ARC/MHE database 88, based on predetermined rules, and/or with reference to the item dimensions and/or the failed attempts—if any of the conveyed items 20 is too large for the reader 70. The processors 114 may dynamically determine (e.g., from the ARC/MHE database 88), or may dynamically perform, an oversized item count of the conveyed items 20 which are determined to be too large for the reader 70 over the time interval. Then, in calculating the scan quality, the detected item count 158 preferably may be adjusted so as to exclude the oversized items identified by the reader 70.

Potential Revenue Loss 1

The processors 114 may multiply the oversized item count by an average item revenue for the conveyed items 20 to determine a first potential revenue loss. Preferably, the average item revenue may be a predetermined one.

Potential Revenue Loss 2

Preferably, when the PPTI is greater than a predetermined target PPTI and the scan quality is lower than a predetermined target scan quality, the processors 114 may determine a second potential revenue loss by multiplying the number 166 of the failed attempts (i.e., for the corresponding time interval) by the average item revenue.

A potential revenue lost 156 may be calculated by summing the first and second potential revenue losses.

Presentation

Figure 5:
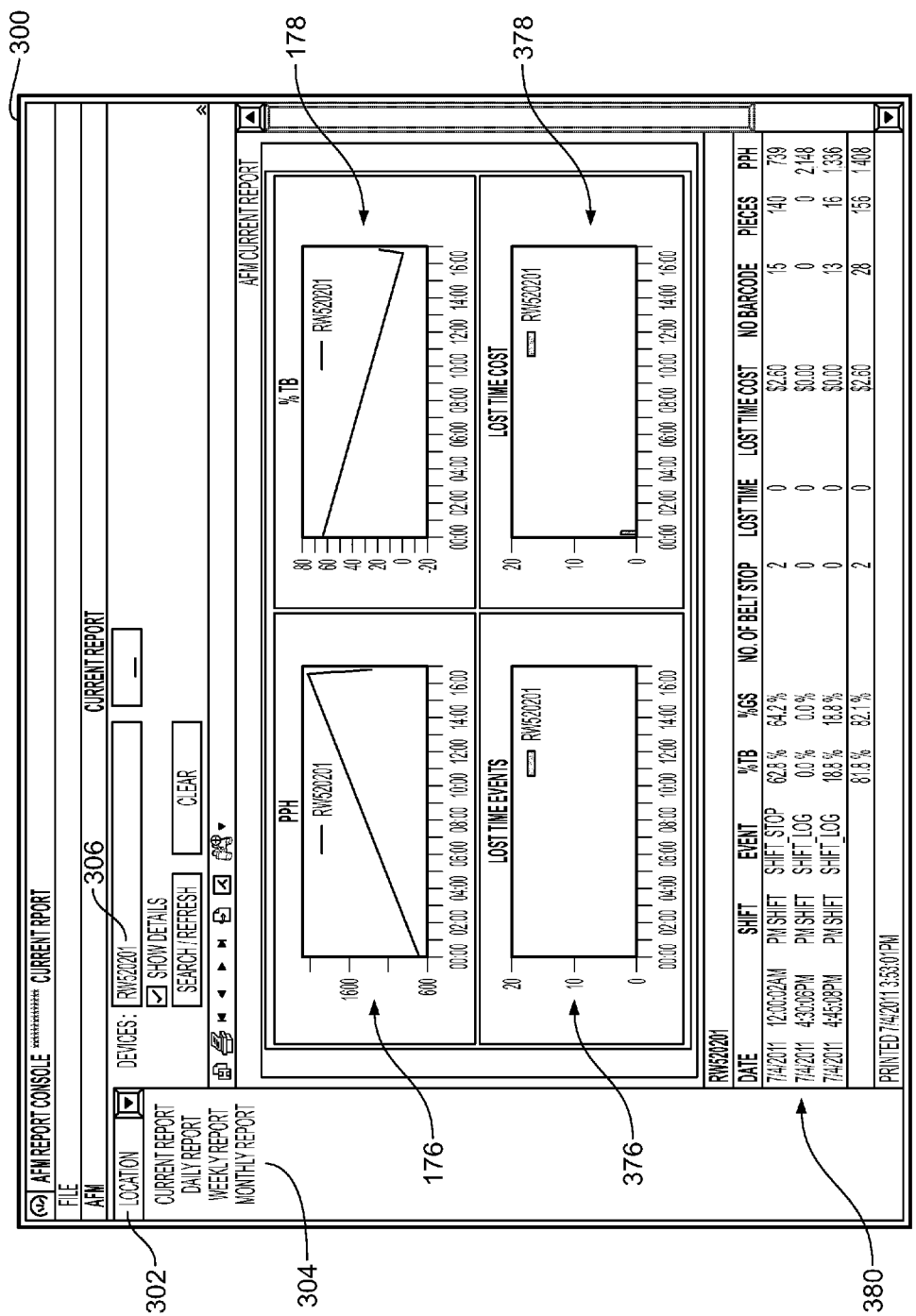
FIG. 5 is an on-screen report presented by the GUI device of FIG. 1.

The processors 114 preferably generate a signal for presentation of the various performance characteristics to a user 22 of the system 50. As shown in FIGS. 1 to 3c, the performance characteristics may be presented by the system 50 using a graphical user interface ("GUI") 132. Alternately, and as shown in FIGS. 1 and 5, the performance characteristics may be presented using one or more reports 300.

FIG. 2 schematically illustrates, among other things, various input/output devices 130 (including the GUI 132, a printer 134, speakers 136, and light emitting diodes 138).

Figure 3A:
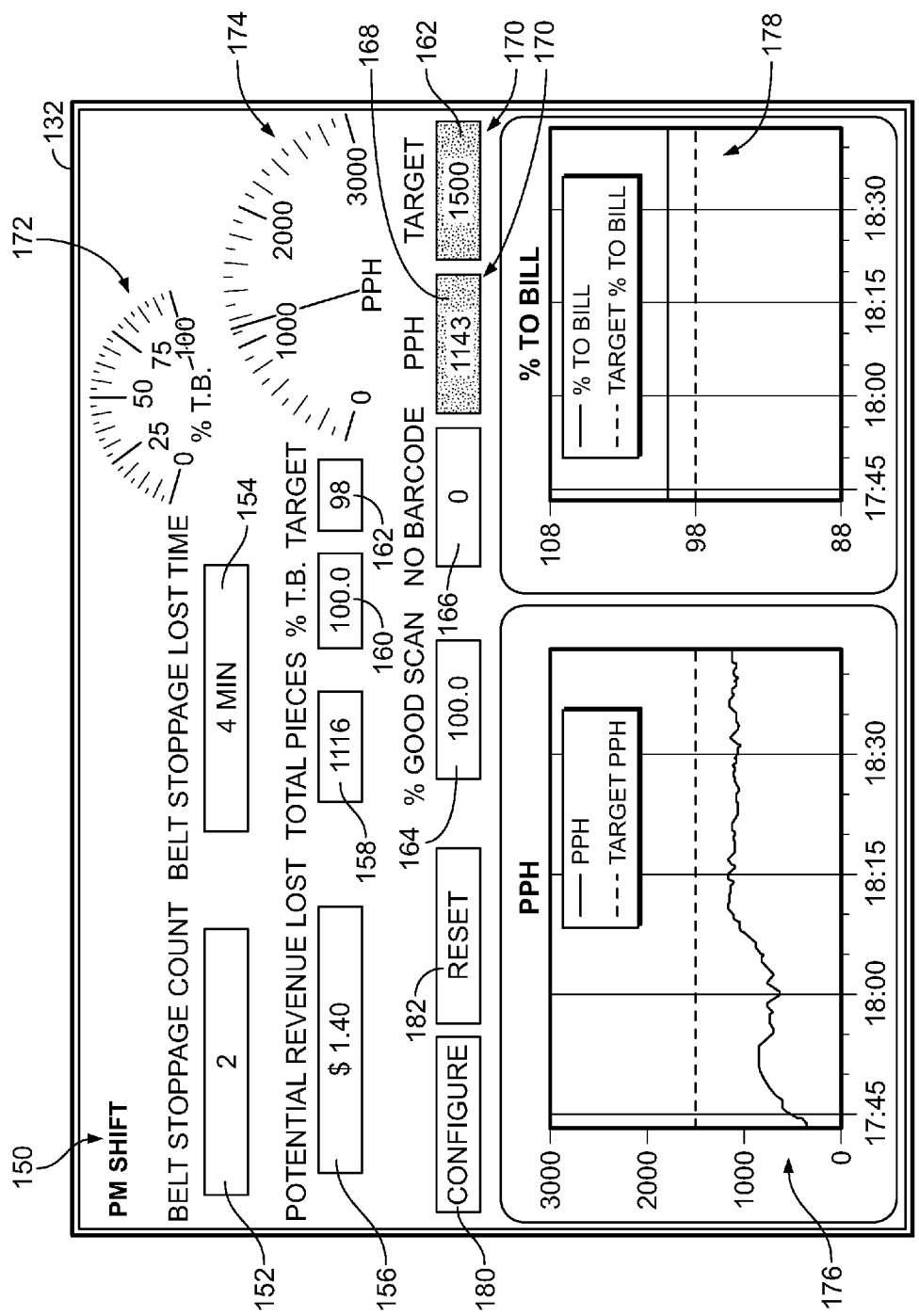
FIG. 3a is a low pieces per hour ("PPH") alert interface presented by a graphical user interface ("GUI") device of the system of FIG. 1.
Figure 3B:
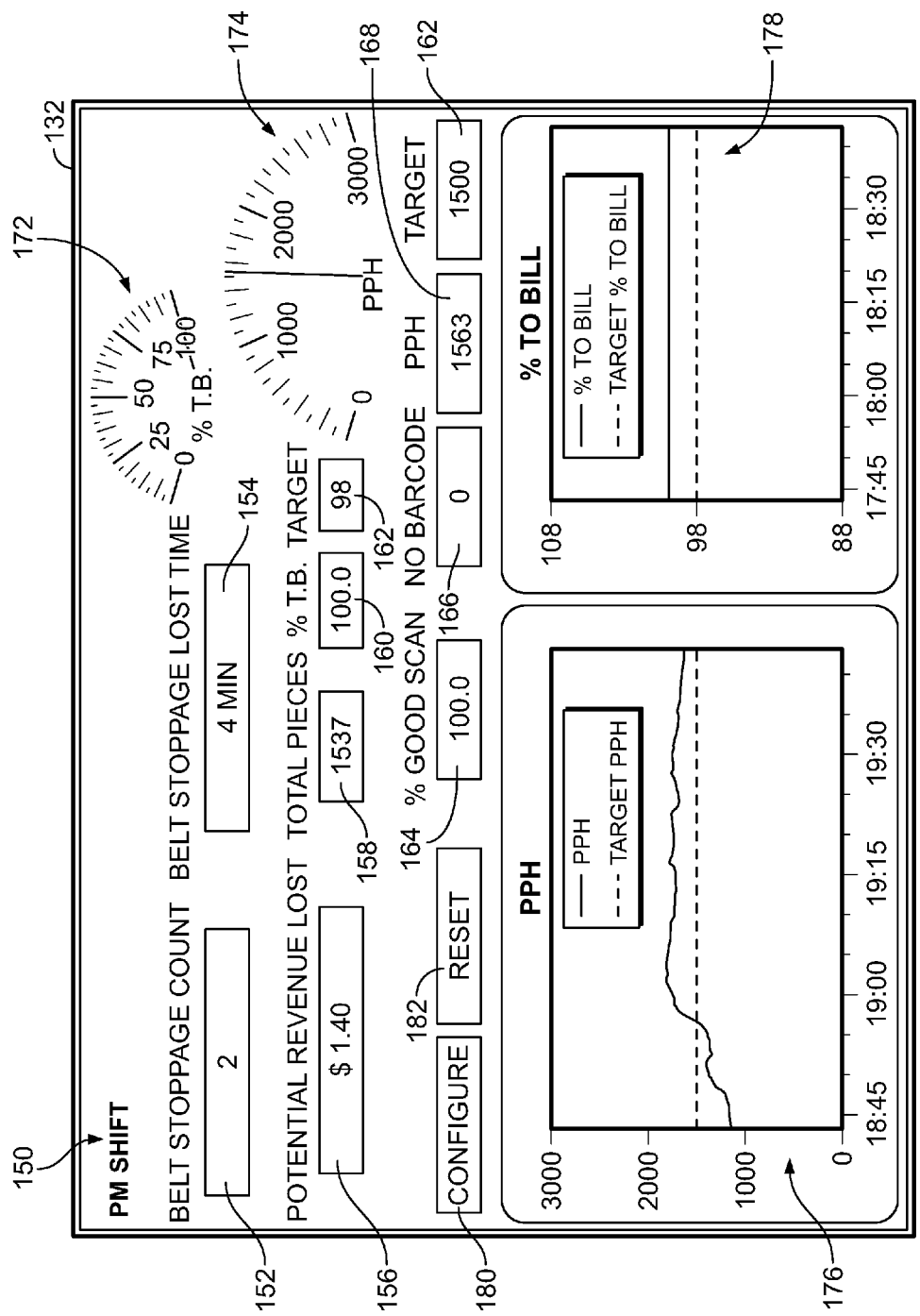
FIG. 3b is a non-alert interface presented by the GUI device of FIG. 1.
Figure 3C:
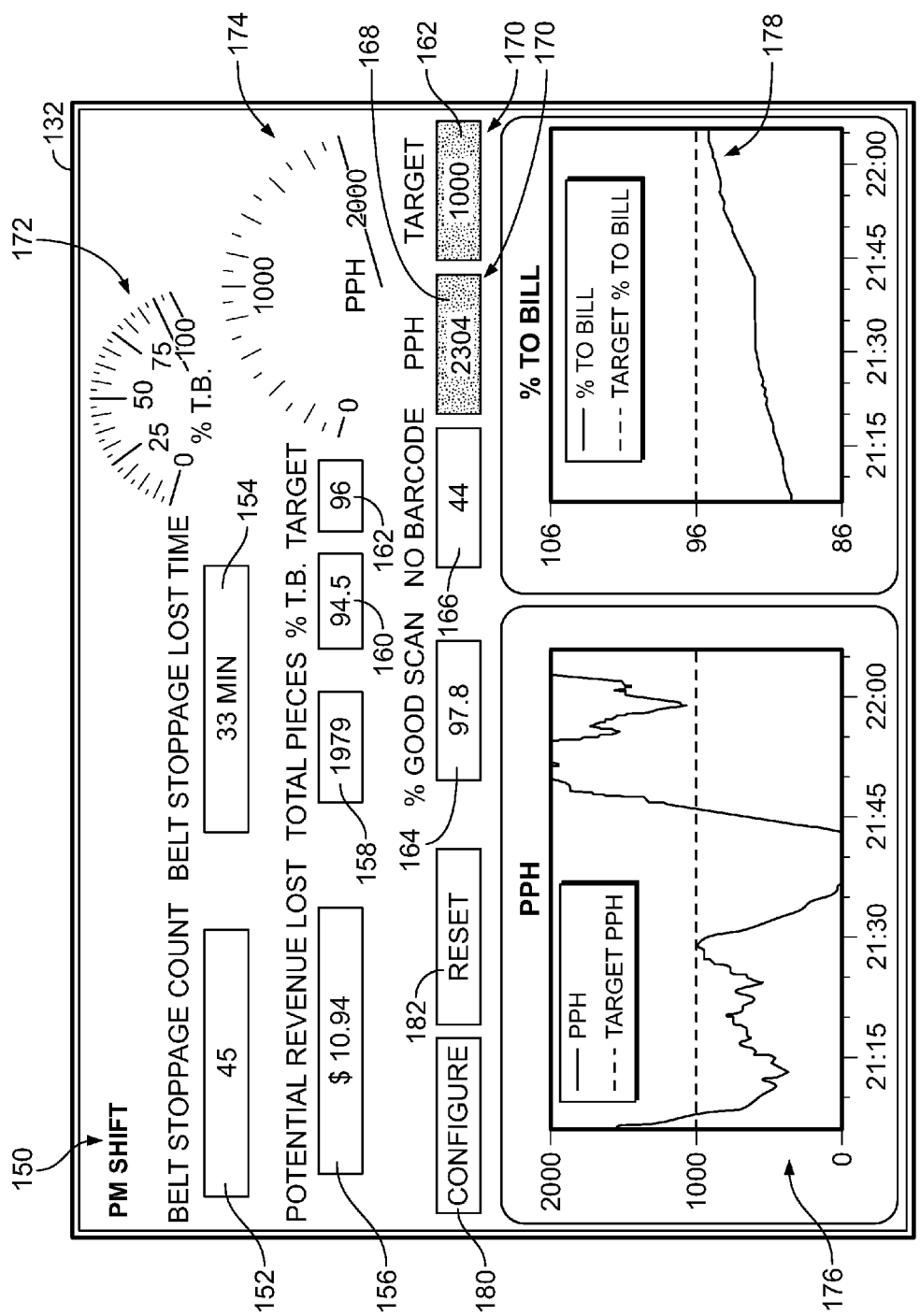
FIG. 3c is a high PPH alert interface presented by the GUI device of FIG. 1.

The GUI 132 may include a touchscreen (and the two terms may be used inter-changeably herein), a display with or without a "point-and-click" mouse or other input device.] As may be appreciated from a consideration of FIGS. 3a to 3c, the GUI device 132 enables (selective or automatic) display of the performance characteristics determined by the processors 114—whether received directly therefrom and/or retrieved from the databases 80, 82—as well as display and input, of the certain target parameters and other data associated with the items 20.

Each one of FIGS. 3a to 3c is a graphical representation of an interface which may preferably be presented by the GUI 132. As shown in FIGS. 3a to 3c, the GUI 132 preferably presents, among other things, an alert 170, a shift indication 150, the number 153 of the stops, the total stop duration 154, the potential revenue lost 156, the detected item count 158, a percent to bill 160, target parameters 162, a percent good scan 164, the number 166 of the failed attempts, and the PPH 168, as well as dashboard representations of the percent to bill and the PPH, 172 and 174 respectively, graphical representations of the PPH and the percent to bill over time, 176 and 178 respectively, a configure button 180, and a reset button 182.

Figure 4:
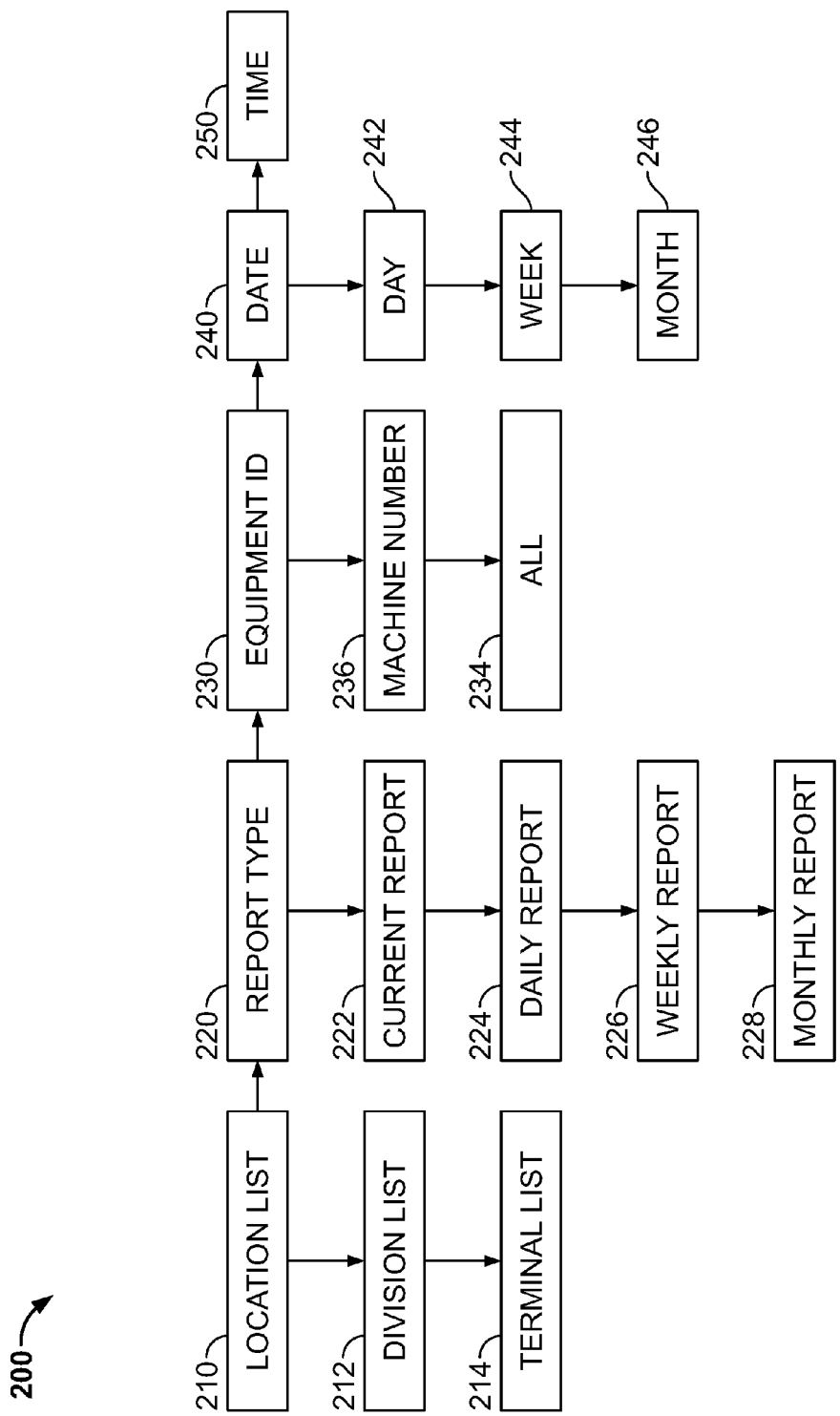
FIG. 4 is a process map of report generation menus associated with the system of FIG. 1.

FIG. 4 graphically represents a series of report generation menus for display on the GUI 132 and/or in a printed report 300 or other record. FIG. 4 shows, among other things, a location list menu 210 (including division list 212 and terminal list 214 menu items), a report type menu 220 (including current report 22, daily report 224, weekly report 226 and monthly report 228 menu items), an equipment identification menu 230 (including machine number 236 and all 234 menu items), a date menu 240 (including day 242, week 244 and month 246 menu items), and a time menu 250—which the user 22 may use to generate the reports 300.

FIG. 5 graphically represents one of the reports 300 which, if displayed on the GUI 132, may afford some interface capabilities. The report 300 is shown as an AFM report console. The report 300 presents, among other things, a location field 302, a report type field 304, a device field 306, a graphical representation of lost time events over time 376, a graphical representation of lost time cost over time 378, and a historical record table 380.

The system 50 may thus be seen to include a report generation unit for generating the reports 300. The following reports may be generated, based upon the flow information and/or the revenue-based information: pre-shift reports which also may be based upon historical information, and which may enhance shift and/or other planning; real-time reports for enhanced control and/or monitoring; and post-shift reports for enhanced post-shift analysis of automated reweigh and/or material handling operations. Such reports may enable or facilitate estimation of potential revenue lost due to a given operating condition, reaction to a particular situation and/or issue (e.g., excessive flow, jam-up, equipment breakdown, and/or other operational and/or customer issues), and reduction of potential lost time, associated manpower costs, or lost revenues.

The GUI 132 displays the flow information, revenue-based information, and/or various alerts. Such alerts may include visual (or audible) warning signals which may be triggered to highlight a given condition to the user 22, for example, if a computed optimal flow rate is not achieved.

Targets

The performance characteristics are preferably compared, using the processors 114, against predetermined target parameters 162 for the performance characteristics.

Alerts

If the performance characteristic is outside of the target parameters 162, when the processors 114 calculate the optimal speed, they may preferably also do so with reference to the performance characteristic. Additionally, the processors 114 will generate an alert 170 for presentation to a user 22 of the system when the performance characteristic is outside of the target parameters 162.

Controller

The controller 64 is adapted to automatically and dynamically adjust an actual speed of the conveyor 62 towards the optimal speed.

The controller 64 interfaces with the material handling equipment 60 and/or the conveyor 62. This interface is adapted to enable automatic control of the material handling equipment 60 and conveyor 62 in dependent relation upon the revenue-based information. This interface, and the dynamic flow control which it enables, may help to increase or maximize revenues in association with automated reweigh cube systems.

According to some embodiments of the invention which may involve the use and integration of multiple conveyors 62 and/or MHEs 60, configurations are available where many conveyors 62 or other MHEs 60—one or more of which may afford some functionality for conveyor 62 and/or item 20 data capture and each of which may afford some functionality for control by a controller 64—communicate with the processors 114 (located locally and/or remotely) which then integrate and merge the control information before disseminating control signals to the various conveyors 62 and MHEs 60. Conveyors 62 and MHEs 60 could each be provided with a unique identifier to enable the processors 114 to distinguish between and control them, as appropriate.

Method

FIGS. 6 to 11 depict selected steps and substeps of a method 400 of adjusting the actual speed of the conveyor 62 for use in identifying conveyed items 20 carried thereby. In the description of the method 400 which follows, the same reference numerals are used as those which are used, above, with reference to the system 50. The method 400 is suitable for use with the system 50 described above and shown in FIGS. 6 to 11, but it is not so limited.

Figure 6:
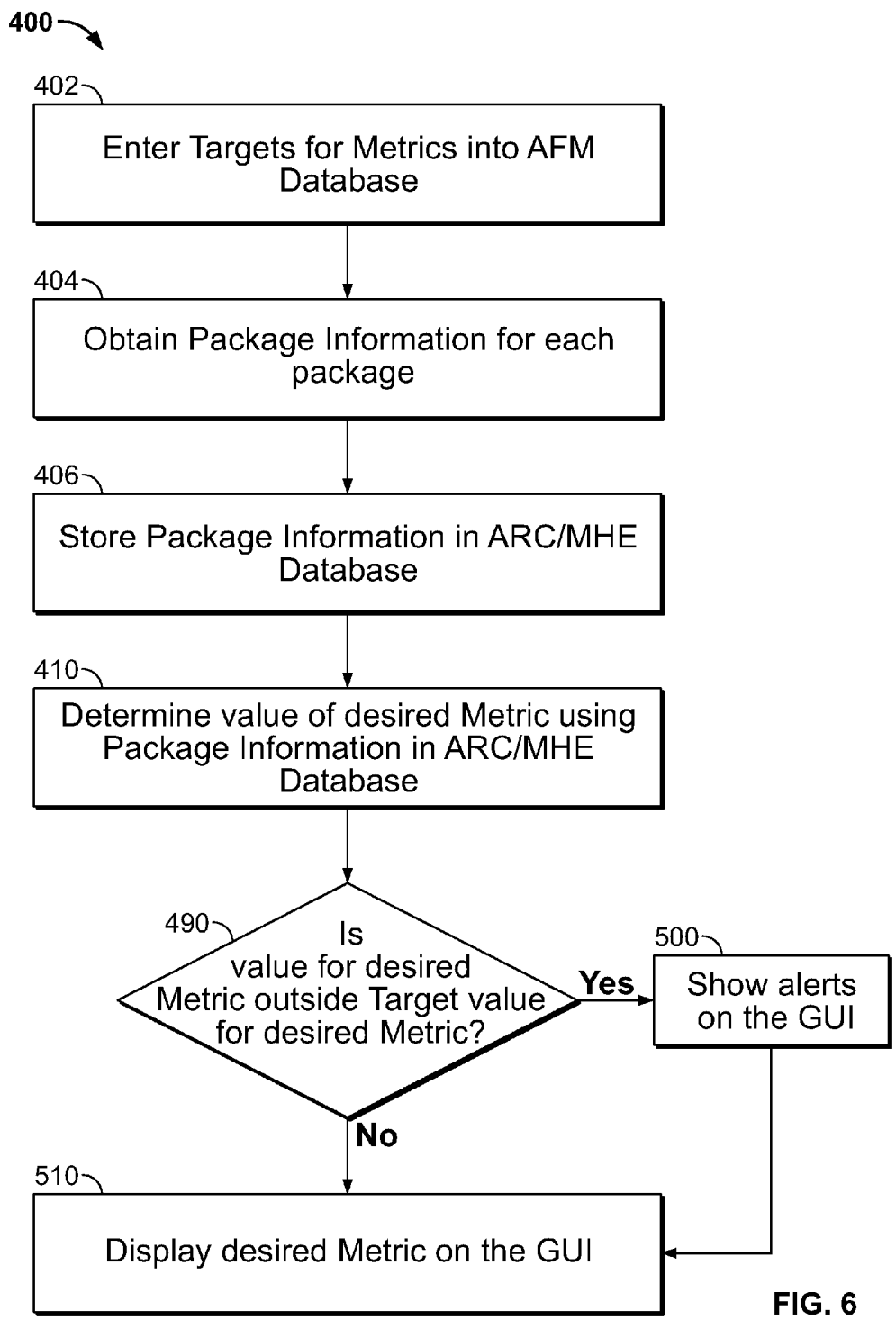
FIG. 6 is a flowchart of an over-arching method of adjusting an actual speed of a conveyor according to a preferred embodiment of the invention.

As shown in FIG. 6, the method 400 includes the following steps, among others: a target predetermination step 402, a package identification step 404, a database updating step 406, a step 410 of determining a metric and/or performance characteristic, a step 490 of querying if the metric or performance characteristic is outside of the appropriate target parameters. In the event that the query is answered in the affirmative (i.e., it does not meet the target parameters), the method 400 proceeds to an alert step 500 of alerting the user 22 and proceeds to a step 510 of presenting it to the user 22. If answered in the negative, the method 400 proceeds directly from step 410 to step 510.

It will be appreciated that, according to the method 400, the conveyed items 20 are automatically detected and identified using the reader 70 associated with the conveyor 62. The databases 80, 82 are regularly updated with data concerning failed attempts by the reader 70 to identify the conveyed items 20, and stops experienced by the conveyor 62. The processors 114 are used to automatically: determine, at regular intervals, a number 166 of the failed attempts, and a duration and a number 152 of the stops experienced by the conveyor 62; and based at least in part thereon, dynamically calculate an optimal speed of the conveyor 62 for reducing the number 166 of the failed attempts, the duration and/or the number 152 of the stops. According to the method 400, the controller 64 is used to automatically and dynamically adjust the actual speed of the conveyor 62 towards the optimal speed. Thus, according to the invention, the method 400 operatively facilitates increasing the conveyed items 20 which are successfully identified by the reader 70.

Figure 7:
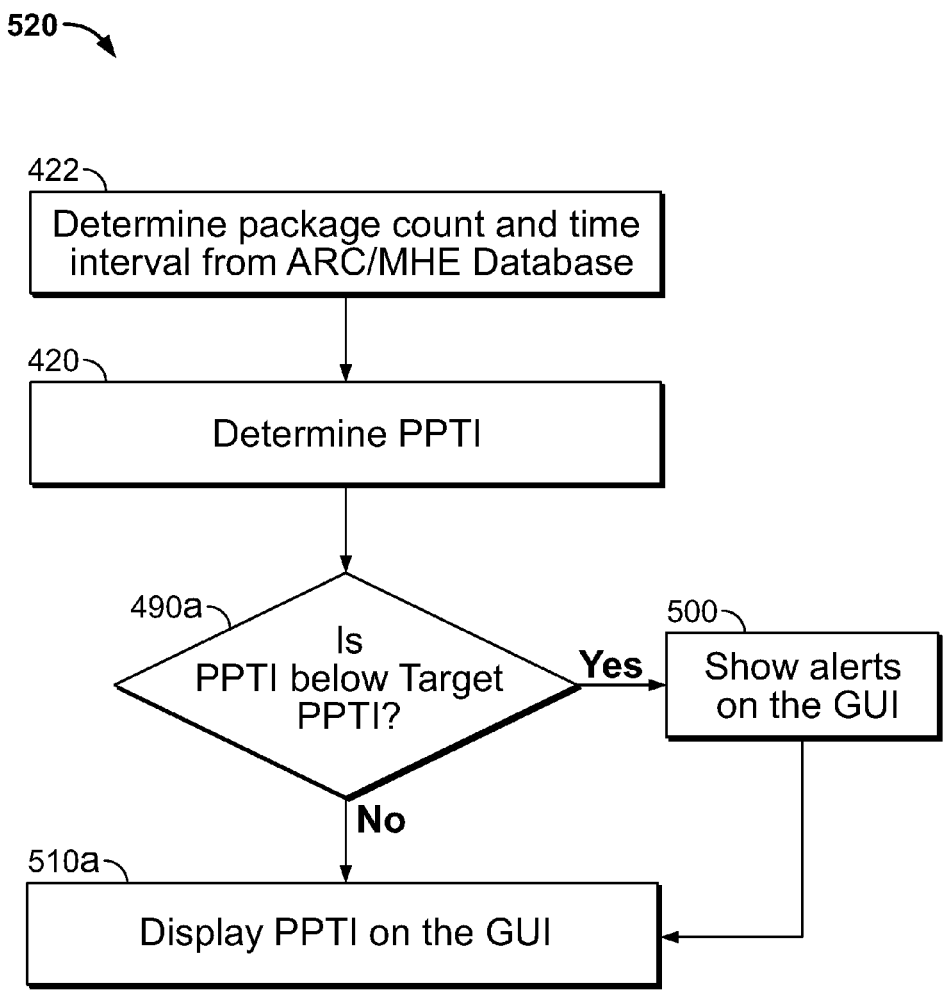
FIG. 7 is a flowchart of a pieces-per-time-interval ("PPTI") subroutine for the method of FIG. 6.
Figure 8:
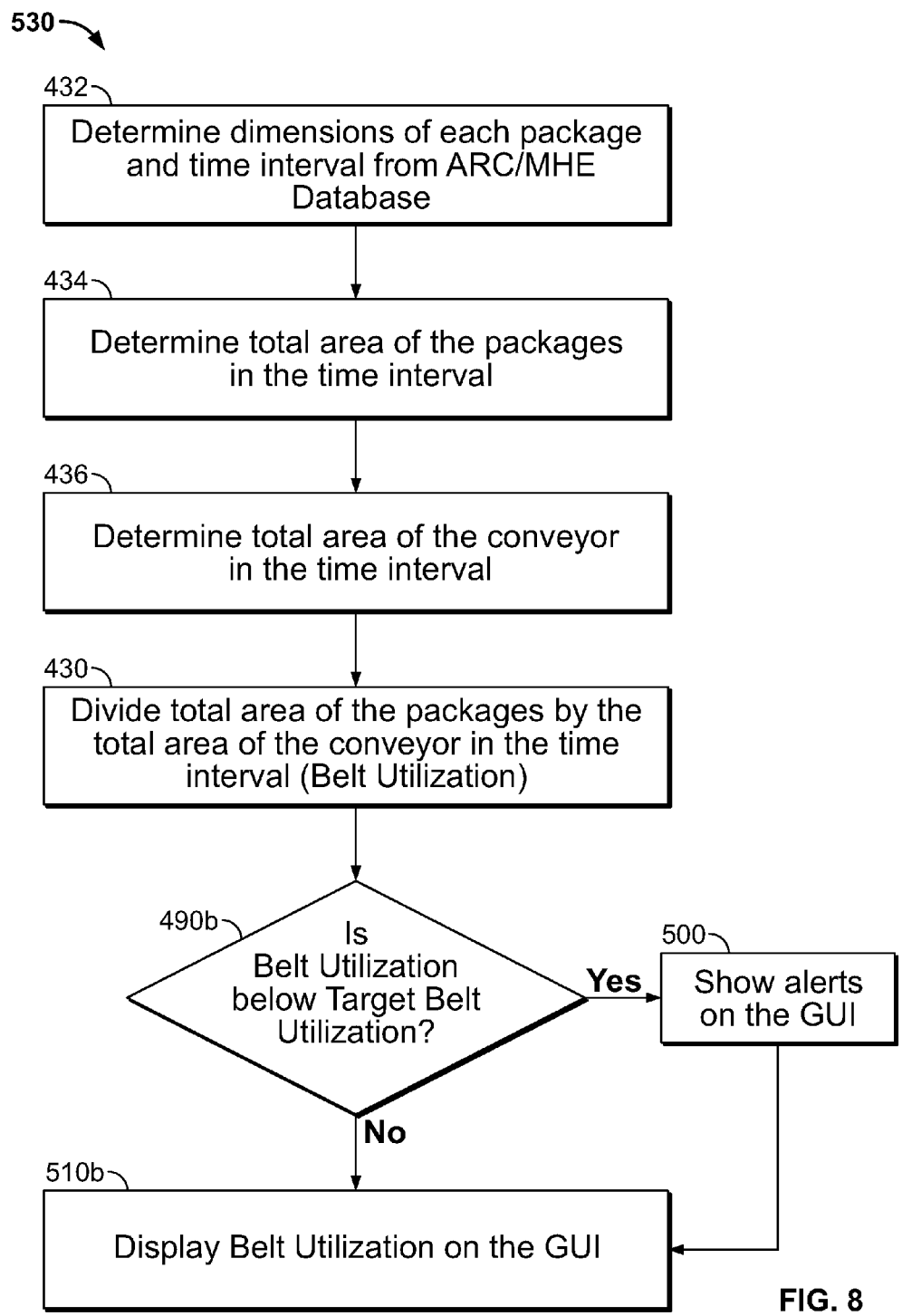
FIG. 8 is a flowchart of a belt utilization subroutine for the method of FIG. 6.
Figure 9:
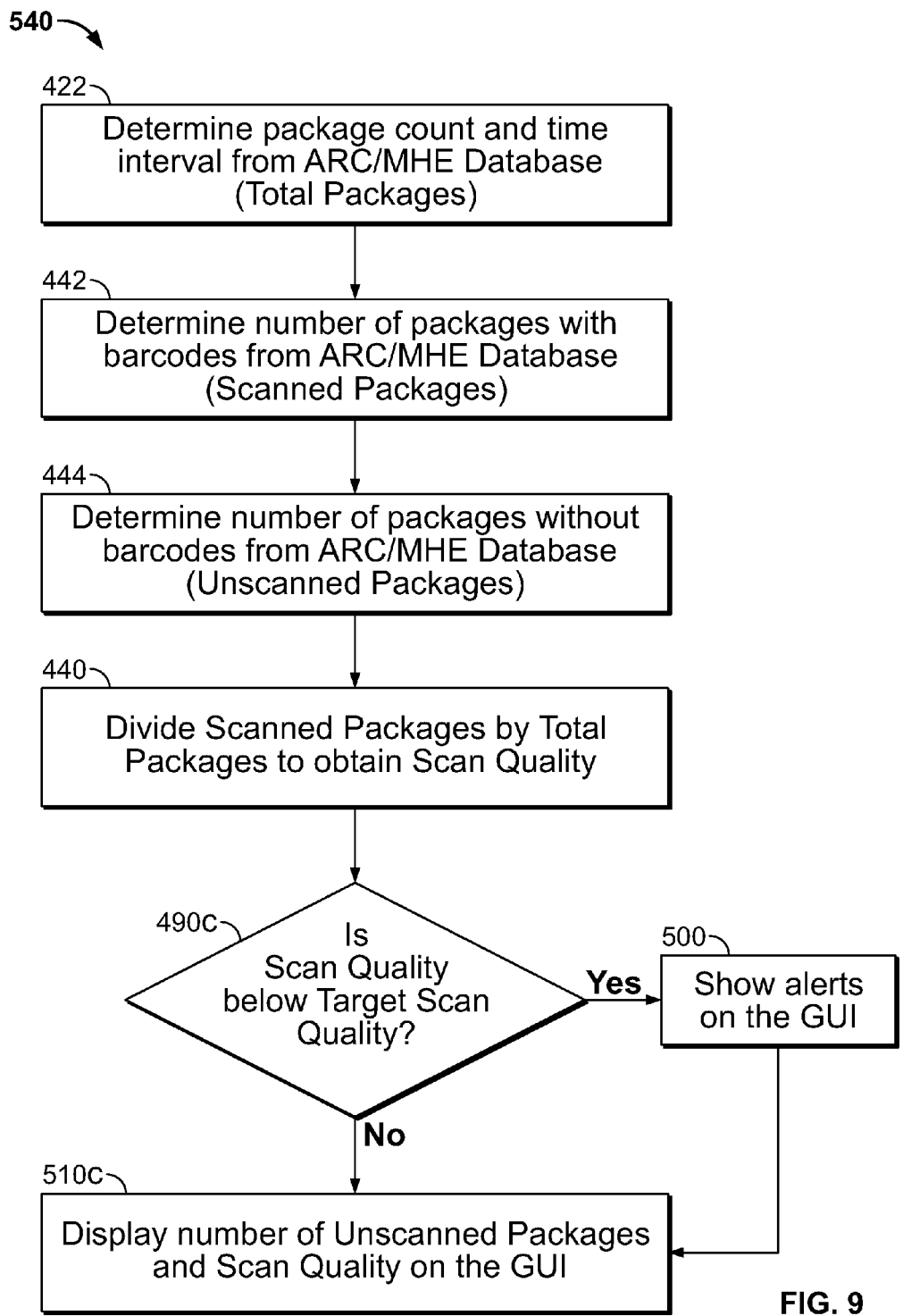
FIG. 9 is a flowchart of an scan quality subroutine for the method of FIG. 6.
Figure 10:
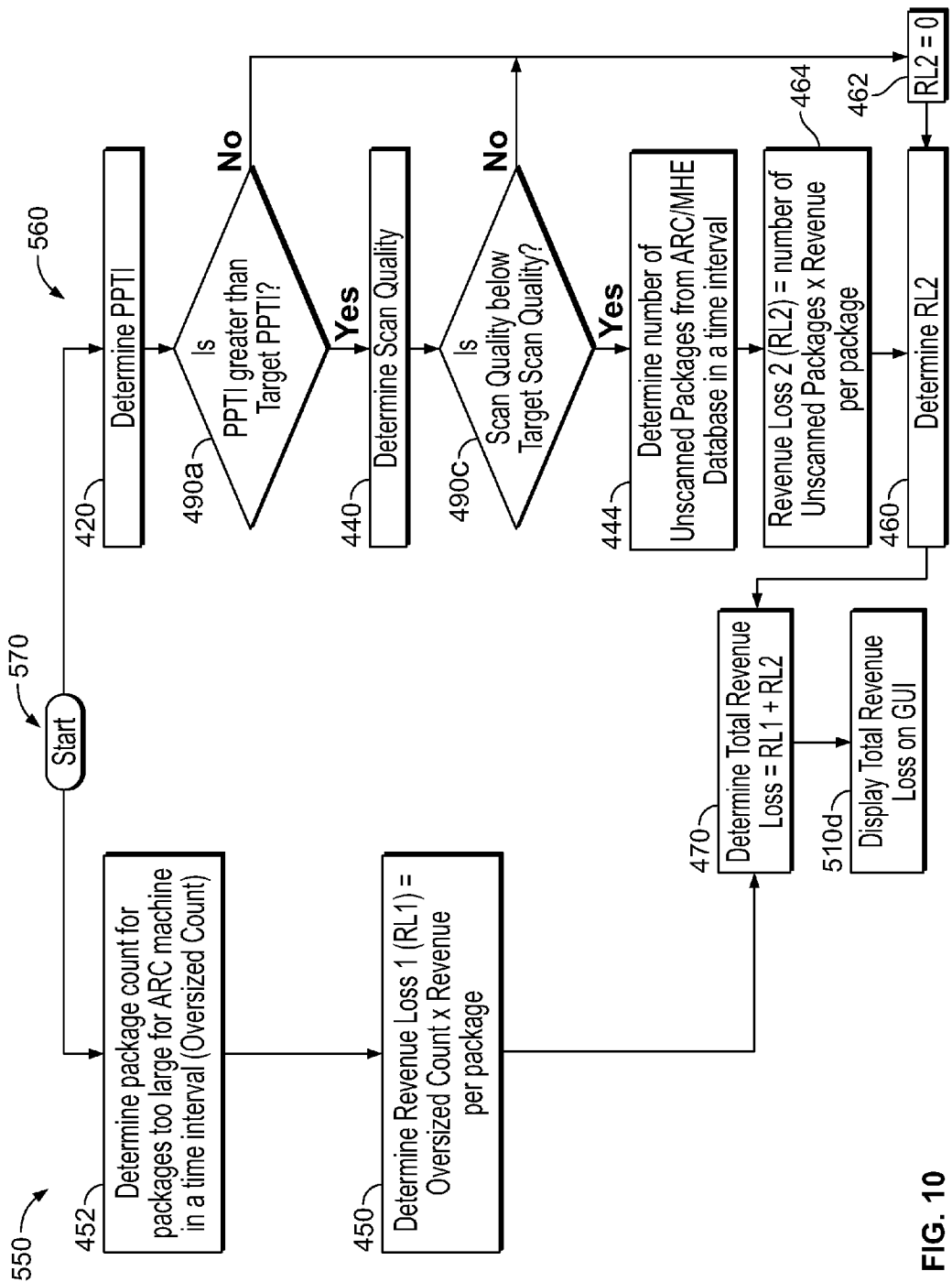
FIG. 10 is a flowchart of a lost revenue subroutine for the method of FIG. 6.
Figure 11:
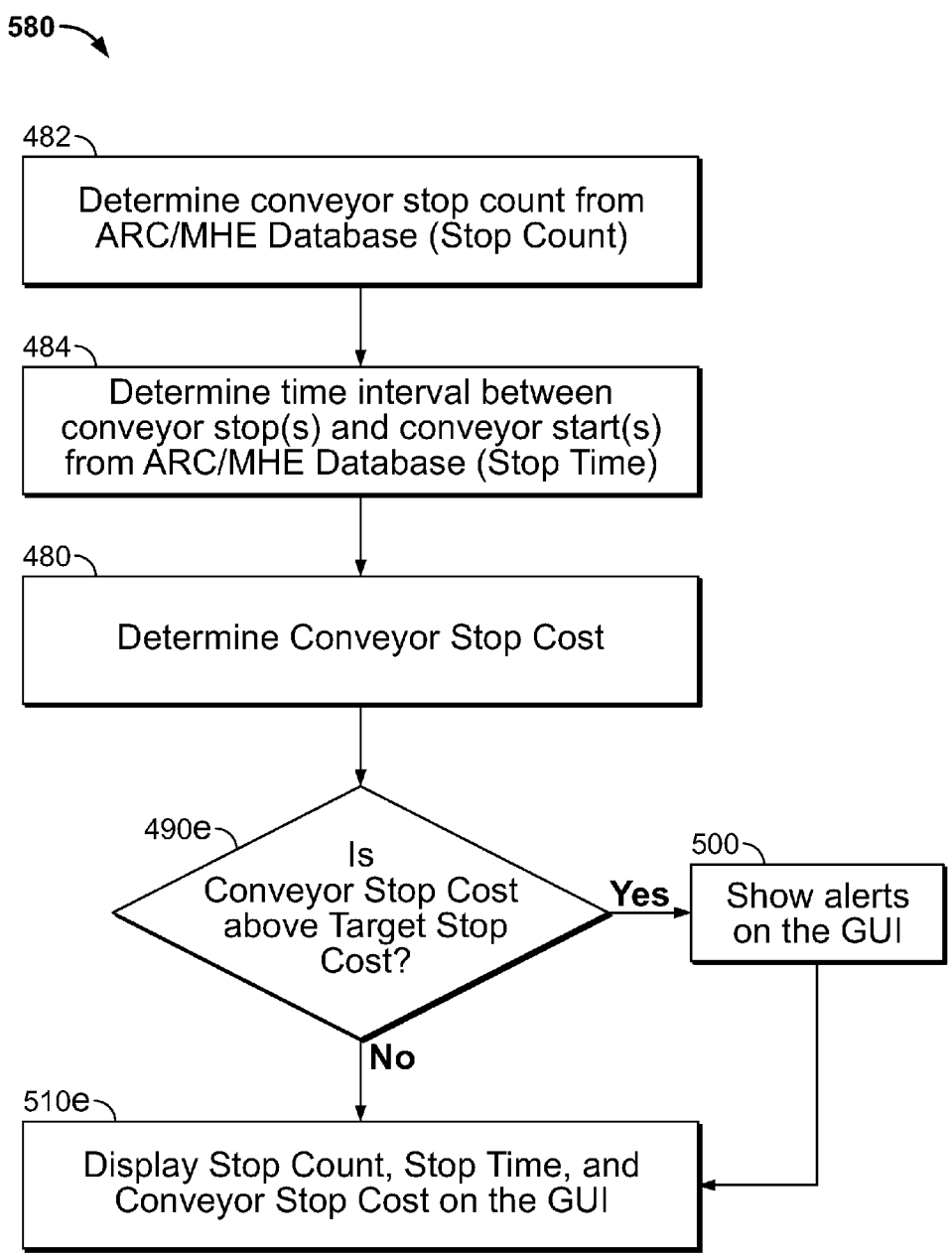
FIG. 11 is a flowchart of stop cost subroutine for the method of FIG. 6.

FIGS. 7 to 11 depict certain subroutines 520, 530, 540, 570, 580 for use with the method 400 in determining the performance characteristics, comparing them against the targets, alerting the user if they fall outside the associated target parameters, and displaying them to the user. More specifically, FIG. 7 depicts a PPTI related subroutine 520, FIG. 8 depicts a conveyor utilization related subroutine 530, FIG. 9 depicts a scan quality subroutine 540, and FIG. 11 depicts a stop cost calculation subroutine 580. It may be appreciated that these subroutines 520, 530, 540, 580 (shown in FIGS. 7 to 9 and 11) may be readily substituted in place of steps 410, 490, 500 and 510 in the method 400 shown in FIG. 6.

In the PPTI related subroutine 520 shown in FIG. 7, the processors 114 determine the performance characteristic by dynamically determining and/or performing a detected item count 158 of the conveyed items 20 detected by the reader 70 over the time interval. FIG. 7 shows a detected item determination step 422, a PPTI calculation step 420, a PPTI comparison query step 490a, the alert step 500, and a PPTI display step 510a.

In the conveyor utilization related subroutine 530 shown in FIG. 8, the processors 114 determine the performance characteristic by first calculating individual footprint areas occupied on the conveyor 62 by each of the conveyed items 20 for which footprint dimensions are detected by the reader 70 over the time interval. They then calculate a total footprint area by summing together the individual footprint areas. Finally, the processors 114 divide the total footprint area by a corresponding area of the conveyor 62 observed by the dimensioning sensors 78 over the time interval. FIG. 8 shows a belt utilization determination step 432, a first belt utilization pre-calculation step 434, a second belt utilization pre-calculation step 436, a belt utilization calculation step 430, a belt utilization comparison query step 490b, the alert step 500, and a belt utilization display step 510b.

In the scan quality subroutine 540 shown in FIG. 9, the processors 114 determine the performance characteristic by first dynamically determining the detected item count 158 of the conveyed items 20 detected by the reader 70 over the time interval. They then dynamically determine an identified item count of the conveyed items 20 identified by the reader 70 over the time interval. Preferably, the detected item count 158 may preferably be less the oversized item count. The processors 114 then divide the identified item count by the detected item count 158 to arrive at the scan quality. FIG. 9 shows the detected item determination step 422, a first scan quality pre-calculation step 442, a second scan quality pre-calculation step 444, a scan quality calculation step 440, a scan quality comparison query step 490c, the alert step 500, and a scan quality display step 510c.

In the stop cost calculation subroutine 580 shown in FIG. 11, the processors 114 calculate a total stop duration 154 by summing together the duration of each of the stops experienced by the conveyor 62 over the time interval. They then obtain the total stop cost by multiplying the total stop duration 154 by an average cost per stopped unit of time. FIG. 11 shows the stop cost determination step 482, a stop cost pre-calculation step 484, a stop cost calculation step 480, a stop cost comparison query step 490e, the alert step 500, and a stop cost display step 510e.

FIG. 10 depicts a potential revenue lost subroutine 570, which includes first and second potential revenue loss subroutines, 550 and 560 respectively. In the first potential revenue loss subroutine 550, the processors 114 automatically determine, based on predetermined rules and with reference to the dimensions and the failed attempts, if any of the conveyed items 20 is too large for the reader 70. They then dynamically determine the oversized item count. To determine the first potential revenue loss, the processors 114 multiply the oversized item count by the average item revenue. FIG. 10 shows the first potential revenue loss subroutine 550 includes a first potential revenue loss determination step 452 and a first potential revenue loss calculation step 450.

FIG. 10 shows the second potential revenue loss subroutine 560 includes the PPTI calculation step 420, a PPTI comparison query step 490a, the scan quality calculation step 440, the scan quality comparison query step 490c, and the second scan quality pre-calculation step 444. It may be appreciated that all or portions of the PPTI related subroutine 520 (shown in FIG. 7) and the scan quality subroutine 540 (shown in FIG. 8) may be readily substituted in place of steps 420, 490a, 440, 490c and 444 of the second potential revenue loss subroutine 560 shown in FIG. 10.

If either or both of the PPTI comparison query step 490a and the scan quality comparison query step 490c are answered in the negative, then the second potential revenue loss subroutine 560 proceeds to a set step 464 of setting the second revenue loss to zero and from there, to a second revenue loss determination step 460. Otherwise, and as can be seen in FIG. 10, the second potential revenue loss subroutine 560 proceeds to the second revenue loss determination step 460 via second revenue loss calculation step 464.

To conclude, the potential revenue lost subroutine 570 proceeds to a total revenue loss step 470 of summing the first and second revenue losses and, from there, to a revenue loss display step 510d.

The computer readable medium 120 stores executable instructions which, upon execution, adjustably control the actual speed of the conveyor 62. The executable instructions include processor instructions 122 for the processors 114 to automatically and according to the invention perform the aforesaid method 400, and perform steps and provide functionality as otherwise described above and elsewhere herein. The processors 114 encoded by the computer readable medium are such as to generate a signal for transmission to the controller 64 for automatic and dynamic adjustment of the actual speed of the conveyor 62 towards the optimal speed. Thus, according to the invention, the computer readable medium 120 facilitates use of the processors 114 to operatively increase the conveyed items 20 which are successfully identified by the reader 70.

Thus, the system 50, method 400 and computer readable medium 120 are adapted to operatively facilitate increasing the conveyed items 20 which are successfully identified by the reader 70.

Notably, the system 50, method 400 and computer readable medium 120 are used for flow management of material handling equipment that is provided with one or more automated reweigh cube systems. The system 50, method 400 and computer readable medium 120 are adapted to interface with the material handling equipment and to provide flow information for use in dynamically (a) controlling, managing, improving and/or optimizing flow and unloading processes, (b) increasing and/or maximizing revenue through flow control, and/or (c) ensuring clear times.

The system 50, method 400 and computer readable medium 120 are adapted to be operatively connected to at least one automated reweigh cube system, and to provide the following flow information, among other things: a count and the precise length of any belt stops experienced by the material handling equipment; a count of the boxes flowing through the automated reweigh cube system; pieces-per-hour information, in real-time and in various increments, during a given shift; and a profiling of the boxes, and/or the size of the boxes, which correspond with the pieces-per-hour information.

The system 50, method 400 and computer readable medium 120 are preferably adapted and/or adaptable for use in parcel delivery and postal applications, in airports and with airlines, and supply chain management. In parcel delivery and postal applications, the system 50, method 400 and the computer readable medium 120 are preferably adapted for transport of conveyable items to trailers, for transport of parcels, and to improve or facilitate movement of conveyable freight. In parcel delivery networks, the system 50, method 400 and the computer readable medium 120 may be employed at each of the numerous locations and terminals across North America. In airports and with airlines, the system 50, method 400 and the computer readable medium 120 are preferably adapted to improve or facilitate movement of baggage and air cans.

This concludes the description of presently preferred embodiments of the invention. The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing from the spirit and scope of the invention. It is intended the scope of the invention be limited not by this description but only by the claims forming a part hereof.

What is claimed is:

1. An adjustable speed control system for use with at least one conveyor and conveyed items carried thereby, wherein the system comprises:
   (a) at least one reader adapted to automatically detect and identify the conveyed items;
   (b) one or more databases comprising, and regularly updated with, data concerning: (i) failed attempts by the reader to identify the conveyed items, and (ii) stops experienced by the conveyor;
   (c) one or more processors adapted to automatically:
      (i) determine, at regular intervals, (A) a number of the failed attempts, and (B) a duration and a number of the stops experienced by the conveyor; and
      (ii) based at least in part thereon, dynamically calculate an optimal speed of the conveyor for reducing the number of the failed attempts, the duration and/or the number of the stops; and
   (d) a controller operatively connected to the conveyor, and adapted to automatically and dynamically adjust an actual speed of the conveyor towards the optimal speed;
   wherein one or more of the processors are further adapted to:
   automatically: (iii) determine, at regular intervals, at least one performance characteristic associated with the conveyor; (iv) compare the performance characteristic against predetermined target parameters therefor; and (v) when the performance characteristic is outside of the target parameters, calculate the optimal speed further based on the performance characteristic; and
   determine the performance characteristic by: (A) summing together the duration of each of the stops experienced by the conveyor over a predetermined time interval to calculate a total stop duration; and (B) multiplying the total stop duration by a predetermined average cost associated with the time interval and with the stops;
   whereby the system is adapted to operatively facilitate increasing the conveyed items which are successfully identified by the reader.

2. A system according to claim 1, wherein the reader identifies each one of the conveyed items by determining at least one item datum associated with said each one, with the item datum selected from a group consisting of a unique identification tag, an item weight, and one or more item dimensions.

3. A system according to claim 1, wherein the reader comprises a scanner, and the reader identifies the conveyed items by using the scanner to automatically read, from each one of the conveyed items, a unique identification tag associated with said each one.

4. A system according to claim 1, wherein the reader comprises one or more weight scales associated with the conveyor and adapted to automatically weigh the conveyed items on the conveyor.

5. A system according to claim 1, wherein the reader comprises one or more dimensioning sensors associated with the conveyor and adapted to automatically detect one or more dimensions associated with each of the conveyed items.

6. A system according to claim 1, wherein one or more of the processors are further adapted to automatically: (iii) determine, at regular intervals, at least one performance characteristic associated with the conveyor; (iv) compare the performance characteristic against predetermined target parameters therefor; and (v) when the performance characteristic is outside of the target parameters, calculate the optimal speed further based on the performance characteristic.

7. A system according to claim 1, wherein said one or more of the processors are further adapted to automatically: (vi) when the performance characteristic is outside of the target parameters, generate an alert for presentation to a user of the system.

8. A system according to claim 1, wherein said one or more of the processors are further adapted to automatically: (vi) generate a signal for presentation of the performance characteristic to a user of the system.

9. A system according to claim 1, wherein one or more of the processors are further adapted to determine the performance characteristic by dynamically determining a detected item count of the conveyed items detected by the reader over a predetermined time interval.

10. A system according to claim 1, wherein the reader comprises one or more dimensioning sensors adapted to observe the conveyor and automatically detect footprint dimensions associated with the conveyed items; and wherein one or more of the processors are further adapted to determine the performance characteristic by:(A') calculating individual footprint areas occupied on the conveyor by each of the conveyed items for which footprint dimensions are detected by the reader over a predetermined time interval; (B') calculating a total footprint area by summing together the individual footprint areas; and (C) dividing the total footprint area by a corresponding area of the conveyor observed by the dimensioning sensors over the time interval.

11. A system according to claim 6, wherein one or more of the processors are further adapted to determine the performance characteristic by: (A) summing together the duration of each of the stops experienced by the conveyor over a predetermined time interval to calculate a total stop duration; and (B) multiplying the total stop duration by a predetermined average cost associated with the time interval and with the stops.

12. A system according to claim 1, wherein said one or more of the processors are further adapted to determine the performance characteristic by: (A') dynamically determining a detected item count of the conveyed items detected by the reader over a predetermined time interval; (B') dynamically determining an identified item count of the conveyed items identified by the reader over the time interval; and (C) dividing the identified item count by the detected item count.

13. A system according to claim 12, wherein the reader comprises one or more dimensioning sensors adapted to automatically detect one or more dimensions associated with the conveyed items; wherein one or more of the processors are further adapted to determine the performance characteristic by: (D) automatically determining, based on predetermined rules and with reference to the dimensions and the failed attempts, automatically determine if any of the conveyed items is too large for the reader, and (E) dynamically determining an oversized item count of the conveyed items which are determined to be too large for the reader over the time interval; and wherein, in determining the performance characteristic, the detected item count is less the oversized item count.

14. A system according to claim 1, wherein the reader comprises one or more dimensioning sensors adapted to automatically detect one or more dimensions associated with the conveyed items; wherein one or more of the processors are further adapted to determine the performance characteristic by: (A') automatically determining, based on predetermined rules and with reference to the dimensions and the failed attempts, if any of the conveyed items is too large for the reader; (B') dynamically determining an oversized item count of the conveyed items which are determined to be too large for the reader over a predetermined time interval; and (C) multiplying the oversized item count by a predetermined average revenue for each of the conveyed items.

15. A system according to claim 1, wherein one or more of the processors are further adapted to determine the performance characteristic over a predetermined time interval by multiplying the number of the failed attempts by a predetermined average item revenue for the conveyed items.

16. A method of adjusting an actual speed of a conveyor for use in identifying conveyed items carried thereby, wherein the method comprises the steps of:
   (a) automatically detecting and identifying the conveyed items using a reader associated with the conveyor;
   (b) regularly updating one or more databases with data concerning (i) failed attempts by the reader to identify the conveyed items, and (ii) stops experienced by the conveyor;
   (c) using one or more processors to automatically:
      (i) determine, at regular intervals, (A) a number of the failed attempts, and (B) a duration and a number of the stops experienced by the conveyor; and
      (ii) based at least in part thereon, dynamically calculate an optimal speed of the conveyor for reducing the number of the failed attempts, the duration and/or the number of the stops; and
   (d) using a controller, operatively connected to the conveyor, to automatically and dynamically adjust the actual speed of the conveyor towards the optimal speed;
   wherein in step (c), one or more of the processors are further used to automatically: (iii) determine, at regular intervals, at least one performance characteristic associated with the conveyor; and (iv) compare the performance characteristic against predetermined target parameters therefor; and when the performance characteristic is outside of the target parameters, the calculation of the optimal speed in substep (c)(ii) is further based on the performance characteristic; and
   wherein in substep (c)(iii), one or more of the processors determine the performance characteristic by: (A) summing together the duration of each of the stops experienced by the conveyor over a predetermined time interval to calculate a total stop duration; and (B) multiplying the total stop duration by a predetermined average cost associated with the time interval and with the stops;
   whereby the method operatively facilitates increasing the conveyed items which are successfully identified by the reader.

17. A method according to claim 16, wherein in step (a), the reader identifies each one of the conveyed items by determining at least one item datum associated with said each one, with the item datum selected from a group consisting of a unique identification tag, an item weight, and one or more item dimensions.

18. A method according to claim 16, wherein in step (a), the reader identifies the conveyed items by using a scanner to automatically read, from each one of the conveyed items, a unique identification tag associated with said each one.

19. A method according to claim 16, wherein in step (a), the reader automatically weighs the conveyed items on the conveyor using one or more weight scales associated with the conveyor.

20. A method according to claim 16, wherein in step (a), the reader automatically detects one or more dimensions associated with each of the conveyed items using one or more dimensioning sensors associated with the conveyor.

21. A method according to claim 16, wherein in step (c), one or more of the processors are further used to automatically: (iii) determine, at regular intervals, at least one performance characteristic associated with the conveyor; and (iv) compare the performance characteristic against predetermined target parameters therefor; and when the performance characteristic is outside of the target parameters, the calculation of the optimal speed in substep (c)(ii) is further based on the performance characteristic.

22. A method according to claim 16, wherein in step (c), one or more of the processors are further used to automatically: (v) when the performance characteristic is outside of the target parameters, generate an alert for presentation to a user.

23. A method according to claim 16, wherein in step (c), one or more of the processors are further used to automatically: (v) generate a signal for presentation of the performance characteristic to a user.

24. A method according to claim 16, wherein in substep (c)(iii), one or more of the processors determine the performance characteristic by dynamically determining a detected item count of the conveyed items detected by the reader over a predetermined time interval.

25. A method according to claim 16, wherein in step (a), the reader uses one or more dimensioning sensors to observe the conveyor and automatically detect footprint dimensions associated with the conveyed items; and wherein in substep (c)(iii), one or more of the processors determine the performance characteristic by: (A') calculating individual footprint areas occupied on the conveyor by each of the conveyed items for which footprint dimensions are detected by the reader over a predetermined time interval; (B') calculating a total footprint area by summing together the individual footprint areas; and (C) dividing the total footprint area by a corresponding area of the conveyor observed by the dimensioning sensors over the time interval.

26. A method according to claim 21, wherein in substep (c)(iii), one more of the processors determine the performance characteristic by: (A) summing together the duration of each of the stops experienced by the conveyor over a predetermined time interval to calculate a total stop duration; and (B) multiplying the total stop duration by a predetermined average cost associated with the time interval and with the stops.

27. A system according to claim 16, wherein in substep (c)(iii), one or more of the processors determine the performance characteristic by: (A) dynamically determining a detected item count of the conveyed items detected by the reader over a predetermined time interval; (B) dynamically determining an identified item count of the conveyed items identified by the reader over the time interval; and (C) dividing the identified item count by the detected item count.

28. A method according to claim 27, wherein in step (a), the reader uses one or more dimensioning sensors to automatically detect one or more dimensions associated with the conveyed items; wherein in substep (c)(iii), one or more of the processors determine the performance characteristic by (D) automatically determining, based on predetermined rules and with reference to the dimensions and the failed attempts, if any of the conveyed items is too large for the reader, and (E) dynamically determining an oversized item count of the conveyed items which are determined to be too large for the reader over the time interval; and wherein in substep (c)(iii), the detected item count is less the oversized item count.

29. A method according to claim 16, wherein in step (a), the reader uses one or more dimensioning sensors to automatically detect one or more dimensions associated with the conveyed items; wherein in substep (c)(iii), one or more of the processors determine the performance characteristic by: (A') automatically determining, based on predetermined rules and with reference to the dimensions and the failed attempts, if any of the conveyed items is too large for the reader; (B') dynamically determining an oversized item count of the conveyed items which are determined to be too large for the reader over a predetermined time interval; and (C) multiplying the oversized item count by a predetermined average revenue for each of the conveyed items.

30. A method according to claim 16, wherein in substep (c)(iii) one or more of the processors determine the performance characteristic over a predetermined time interval by multiplying the number of the failed attempts by a predetermined average item revenue for the conveyed items.

31. A computer readable medium on which is physically stored executable instructions which, upon execution, will adjustably control an actual speed of a conveyor provided with a controller; for use with conveyed items carried thereby, with a reader adapted to automatically detect and identify the conveyed items, and with a database comprising data concerning stops experienced by the conveyor and failed attempts by the reader to identify the conveyed items; wherein the executable instructions comprise processor instructions for one or more processors to automatically:
   (a) determine, at regular intervals, (i) a number of the failed attempts, and (ii) a duration and a number of the stops experienced by the conveyor;
   (b) based at least in part thereon, dynamically calculate an optimal speed of the conveyor for reducing the number of the failed attempts, the duration and/or the number of the stops; and
   (c) generate a signal for transmission to the controller for automatic and dynamic adjustment of the actual speed of the conveyor towards the optimal speed;
   wherein the processor instructions are additionally for one or more of the processors to:
      automatically: (d) determine, at regular intervals, at least one performance characteristic associated with the conveyor; (e) compare the performance characteristic against predetermined target parameters therefor; and (f) when the performance characteristic is outside of the target parameters, calculate the optimal speed also based on the performance characteristic; and
      determine the performance characteristic by: (i) summing together the duration of each of the stops experienced by the conveyor over a predetermined time interval to calculate a total stop duration; and (ii) multiplying the total stop duration by a predetermined average cost associated with the time interval and with the stops;
   to thus operatively facilitate use of the processors to increase the conveyed items which are successfully identified by the reader.

32. A computer readable medium according to claim 31, wherein the processor instructions are additionally for one or more of the processors to automatically: (d) determine, at regular intervals, at least one performance characteristic associated with the conveyor; (e) compare the performance characteristic against predetermined target parameters therefor; and (f) when the performance characteristic is outside of the target parameters, calculate the optimal speed also based on the performance characteristic.

33. A computer readable medium according to claim 31, wherein the processor instructions are additionally for one or more of the processors to automatically: (g) when the performance characteristic is outside of the predetermined target parameters, generate an alert for presentation to a user.

34. A computer readable medium according to claim 31, wherein the processor instructions are additionally for one or more of the processors to automatically: (g) generate a signal for presentation of the performance characteristic to a user.

35. A computer readable medium according to claim 31, wherein the processor instructions are additionally for one or more of the processors to determine the performance characteristic by dynamically determining a detected item count of the conveyed items detected by the reader over a predetermined time interval.

36. A computer readable medium according to claim 31, wherein the processor instructions are additionally for one or more of the processors to determine the performance characteristic by: (i') calculating individual footprint areas occupied on the conveyor by each of the conveyed items for which footprint dimensions are detected by the reader over a predetermined time interval; (ii') calculating a total footprint area by summing together the individual footprint areas; and (iii) dividing the total footprint area by a corresponding area of the conveyor passing the reader over the time interval.

37. A computer readable medium according to claim 32, wherein the processor instructions are additionally for one or more of the processors to determine the performance characteristic by: (i) summing together the duration of each of the stops experienced by the conveyor over a predetermined time interval to calculate a total stop duration; and (ii) multiplying the total stop duration by a predetermined average cost associated with the time interval and with the stops.

38. A computer readable medium according to claim 31, wherein the processor instructions are additionally for one or more of the processors to determine the performance characteristic by: (i') dynamically determining a detected item count of the conveyed items detected by the reader over a predetermined time interval; (ii') dynamically determining an identified item count of the conveyed items identified by the reader over the time interval; and (iii) dividing the identified item count by the detected item count.

39. A computer readable medium according to claim 38, wherein the processor instructions are additionally for one or more of the processors to further determine the performance characteristic by: (iv) automatically determining, based on predetermined rules and with reference to the failed attempts and dimensions of the conveyed items detected by the reader, if any of the conveyed items is too large for the reader, and (v) dynamically determining an oversized item count of the conveyed items which are determined to be too large for the reader over the time interval; and wherein the detected item count is less the oversized item count.

40. A computer readable medium according to claim 31, wherein the processor instructions are additionally for one or more of the processors to determine the performance characteristic by: (i') automatically determining, based on predetermined rules and with reference to the failed attempts and dimensions of the conveyed items detected by the reader, if any of the conveyed items is too large for the reader; (ii') dynamically determining an oversized item count of the conveyed items which are determined to be too large for the reader over a predetermined time interval; and (iii) multiplying the oversized item count by a predetermined average revenue for each of the conveyed items.

41. A computer readable medium according to claim 31, wherein the processor instructions are additionally for one or more of the processors to determine the performance characteristic over a predetermined time interval by multiplying the number of the failed attempts by a predetermined average item revenue for the conveyed items.

42. An adjustable speed control system for use with at least one conveyor and conveyed items carried thereby, wherein the system comprises:
(a) at least one reader adapted to automatically detect and identify the conveyed items;
(b) one or more databases comprising, and regularly updated with, data concerning: (i) failed attempts by the reader to identify the conveyed items, and (ii) stops experienced by the conveyor;
(c) one or more processors adapted to automatically:
  (i) determine, at regular intervals, (A) a number of the failed attempts, and (B) a duration and a number of the stops experienced by the conveyor; and
  (ii) based at least in part thereon, dynamically calculate an optimal speed of the conveyor for reducing the number of the failed attempts, the duration and/or the number of the stops; and
(d) a controller operatively connected to the conveyor, and adapted to automatically and dynamically adjust an actual speed of the conveyor towards the optimal speed;
wherein one or more of the processors are further adapted to:
  automatically: (iii) determine, at regular intervals, at least one performance characteristic associated with the conveyor; (iv) compare the performance characteristic against predetermined target parameters therefor; and (v) when the performance characteristic is outside of the target parameters, calculate the optimal speed further based on the performance characteristic; and
  determine the performance characteristic by: (A) dynamically determining a detected item count of the conveyed items detected by the reader over a predetermined time interval; (B) dynamically determining an identified item count of the conveyed items identified by the reader over the time interval; and (C) dividing the identified item count by the detected item count; whereby the system is adapted to operatively facilitate increasing the conveyed items which are successfully identified by the reader.

43. A method of adjusting an actual speed of a conveyor for use in identifying conveyed items carried thereby, wherein the method comprises the steps of:
(a) automatically detecting and identifying the conveyed items using a reader associated with the conveyor;
(b) regularly updating one or more databases with data concerning (i) failed attempts by the reader to identify the conveyed items, and (ii) stops experienced by the conveyor;
(c) using one or more processors to automatically:
  (i) determine, at regular intervals, (A) a number of the failed attempts, and (B) a duration and a number of the stops experienced by the conveyor; and
  (ii) based at least in part thereon, dynamically calculate an optimal speed of the conveyor for reducing the number of the failed attempts, the duration and/or the number of the stops; and
(d) using a controller, operatively connected to the conveyor, to automatically and dynamically adjust the actual speed of the conveyor towards the optimal speed;

wherein in step (c), one or more of the processors are further used to automatically: (iii) determine, at regular intervals, at least one performance characteristic associated with the conveyor; and (iv) compare the performance characteristic against predetermined target parameters therefor; and when the performance characteristic is outside of the target parameters, the calculation of the optimal speed in substep (c)(ii) is further based on the performance characteristic; and
wherein in substep (c)(iii), one or more of the processors determine the performance characteristic by: (A) dynamically determining a detected item count of the conveyed items detected by the reader over a predetermined time interval; (B) dynamically determining an identified item count of the conveyed items identified by the reader over the time interval; and
(C) dividing the identified item count by the detected item count;
whereby the method operatively facilitates increasing the conveyed items which are successfully identified by the reader.

44. A computer readable medium on which is physically stored executable instructions which, upon execution, will adjustably control an actual speed of a conveyor provided with a controller; for use with conveyed items carried thereby, with a reader adapted to automatically detect and identify the conveyed items, and with a database comprising data concerning stops experienced by the conveyor and failed attempts by the reader to identify the conveyed items; wherein the executable instructions comprise processor instructions for one or more processors to automatically:
(a) determine, at regular intervals, (i) a number of the failed attempts, and (ii) a duration and a number of the stops experienced by the conveyor;
(b) based at least in part thereon, dynamically calculate an optimal speed of the conveyor for reducing the number of the failed attempts, the duration and/or the number of the stops; and
(c) generate a signal for transmission to the controller for automatic and dynamic adjustment of the actual speed of the conveyor towards the optimal speed;
wherein the processor instructions are additionally for one or more of the processors to:
  automatically: (d) determine, at regular intervals, at least one performance characteristic associated with the conveyor; (e) compare the performance characteristic against predetermined target parameters therefor; and (f) when the performance characteristic is outside of the target parameters, calculate the optimal speed also based on the performance characteristic; and
  determine the performance characteristic by: (i) dynamically determining a detected item count of the conveyed items detected by the reader over a predetermined time interval; (ii) dynamically determining an identified item count of the conveyed items identified by the reader over the time interval; and (iii) dividing the identified item count by the detected item count; to thus operatively facilitate use of the processors to increase the conveyed items which are successfully identified by the reader.

* * * * *